US012609365B2

(12) United States Patent
Rumbaugh et al.

(10) Patent No.: US 12,609,365 B2
(45) Date of Patent: Apr. 21, 2026

(54) MULTI-VOLTAGE AUXILIARY POWER SYSTEM FOR HEAVY-DUTY EQUIPMENT

(71) Applicant: Ox Partners, LLC, Lake Oswego, OR (US)

(72) Inventors: Scott Hamilton Rumbaugh, Tigard, OR (US); Nathan Robert Hoch, Fort Wayne, IN (US)

(73) Assignee: Ox Partners, LLC, Lake Oswego, OR (US)

( * ) Notice: Subject to any disclaimer, the term of this patent is extended or adjusted under 35 U.S.C. 154(b) by 0 days.

(21) Appl. No.: 19/074,124

(22) Filed: Mar. 7, 2025

(65) Prior Publication Data

US 2026/0106233 A1 Apr. 16, 2026

Related U.S. Application Data

(60) Provisional application No. 63/705,864, filed on Oct. 10, 2024.

(51) Int. Cl.
| | |
|---|---|
| *B60R 16/033* | (2006.01) |
| *G07C 5/00* | (2006.01) |
| *H01M 10/42* | (2006.01) |
| *H01M 10/615* | (2014.01) |
| *H01M 10/625* | (2014.01) |
| *H01M 50/249* | (2021.01) |

(52) U.S. Cl.
CPC ......... *H01M 10/425* (2013.01); *B60R 16/033* (2013.01); *G07C 5/008* (2013.01); *H01M 10/615* (2015.04); *H01M 10/625* (2015.04); *H01M 50/249* (2021.01); *H01M 2010/4271* (2013.01); *H01M 2010/4278* (2013.01); *H01M 2220/20* (2013.01)

(58) Field of Classification Search
CPC ............. H01M 10/425; H01M 10/615; H01M 10/625; H01M 50/249; H01M 2010/4271; H01M 2010/42789; H01M 2220/20; B60R 16/033; G07C 5/008
USPC ......................................................... 307/10.6
See application file for complete search history.

(56) References Cited

U.S. PATENT DOCUMENTS

| | | | |
|---|---|---|---|
| 4,902,956 A | 2/1990 | Sloan | |
| 5,986,431 A * | 11/1999 | Hayes | ................... H02J 7/1423 |
| | | | 320/112 |

(Continued)

OTHER PUBLICATIONS

Vanair, Start All Jump Pack 10,000 A, Part No. JP-12-10000-003T, retrieved online at https://www.raneystruckparts.com/startall-jumppack-12v-10000amp-133200-joules-5s/?sku=44568&utm_source=google&utm_medium=cpc&utm_campaign=ROI%20-%20Raneys%20-%20US%20-%20Google%20-%20PMAX%20-%20Other&utm_id=20150588601&utm_content=&utm_term=&gad_source=1&gclid=CjwKCAjw--.

*Primary Examiner* — Michael R. Fin
(74) *Attorney, Agent, or Firm* — Foster Garvey PC

(57) ABSTRACT

A multi-voltage auxiliary power system is for heavy-duty equipment having a starter and vehicle electronics powered by a nominal 12V supply. The multi-voltage auxiliary power system has a battery system configured to provide first and second output voltage levels that are different from each other, in which the first output voltage level is higher than the second output voltage level; and control circuitry configured to: detect a cranking event in the heavy-duty equipment; in response to detecting the cranking event, apply the first output voltage level to the starting and battery system; and switch to applying the second output voltage level to sustain the nominal 12V supply for the vehicle electronics when the cranking is complete.

20 Claims, 17 Drawing Sheets

(56) References Cited

U.S. PATENT DOCUMENTS

| | | | |
|---|---|---|---|
| 10,840,732 | B2 | 11/2020 | Rumbaugh et al. |
| 11,421,641 | B2 * | 8/2022 | Burke ................. F02N 11/0866 |
| 12,074,297 | B2 | 8/2024 | Rumgaugh et al. |
| 2002/0092492 | A1 | 7/2002 | Ohanian et al. |
| 2004/0212342 | A1 * | 10/2004 | Batson ................. H02J 7/0047 |
| | | | 320/107 |
| 2005/0156559 | A1 | 7/2005 | Thibedeau et al. |
| 2010/0236851 | A1 | 9/2010 | Van et al. |
| 2011/0057624 | A1 | 3/2011 | Rizzo |
| 2015/0300307 | A1 * | 10/2015 | Setterberg ............ H02J 7/1423 |
| | | | 701/113 |
| 2019/0207266 | A1 * | 7/2019 | Biggs, Jr. ............ H01M 10/425 |
| 2020/0072177 | A1 * | 3/2020 | Clarke ................. H02J 7/0048 |
| 2020/0148143 | A1 * | 5/2020 | Huang ................. B60R 16/033 |
| 2020/0370527 | A1 * | 11/2020 | Sturtevent ........... F02N 11/0803 |
| 2021/0017944 | A1 * | 1/2021 | Artur Du Plessis .... F02N 11/10 |
| 2021/0094438 | A1 * | 4/2021 | Ciccone ................. B60L 58/24 |
| 2021/0376639 | A1 * | 12/2021 | Lin ....................... H02J 7/1423 |
| 2024/0227535 | A1 | 7/2024 | Stoltz et al. |
| 2025/0058725 | A1 * | 2/2025 | Bultman ................. F02N 11/04 |

* cited by examiner

| Vehicle State | | Modes | | | | |
| --- | --- | --- | --- | --- | --- | --- |
| Engine | Key Position | Sleep | Standby | 12V nominal | Pre-charge | Crank |
| Off | OFF | | | | | |
| Off | ACC | | | | | |
| Off | ON | | | | | |
| Cranking | START | | | | | |
| Running | ON | | | | | |

300

202

| Mode | Mode Change Conditions | |
|------|------------------------|---|
| | Enter | Exit |
| Sleep | Enter from Standby when Standby mode times out. | Exit to standby mode with start attempt, change key from Off to ACC or to ON, need for Cell communication or OTA FW update |
| Standby | Enter from sleep with start attempt, change of key from OFF to ACC or to ON. Enter from crank if max cranking limits are exceeded. | Exit to Sleep when Standby Mode times out. Exit to Crank during start attempt. Exit to Pre-Charge nominal if key moved to ACC or ON. |
| 12V Nominal | Enter from Pre-Charge after Pre-charge time out. Enter from Crank after engine starts. | Exit to standby if engine is running and vehicle batteries can sustain operation. |
| Pre-charge | Enter from Standby when engine not running and key moved to ACC or ON. | Exit to 12V Nominal if Key remains in ACC or ON and Pre-charge mode times out. Exit to crank on start attempt. |
| Crank | Enter from Pre-charge during start attemp. | Exit to 12V when engine starts. Exit to Standby if max cranking limits exceeded. Exit to Pre-charge if start attempt fails. |

Negative Output

UI/Connectivity Circuit PCBA

Control Circuit PCBA

Battery #1

Internal Chassis

Busbar #2

Busbar #1

BMS #1 and BMS #2

Positive Output

MOSFET Circuit PCBA

Battery #2

MULTI-VOLTAGE AUXILIARY POWER SYSTEM FOR HEAVY-DUTY EQUIPMENT

RELATED APPLICATION

The application claims priority benefit of U.S. Provisional Patent Application No. 63/705,864 filed Oct. 10, 2024, which is hereby incorporated by reference in its entirety.

TECHNICAL FIELD

The present disclosure generally relates to starting heavy-duty equipment. In particular, the disclosure relates to auxiliary power systems for starting such equipment.

BACKGROUND INFORMATION

Heavy-duty equipment encompasses large, powerful vehicles and machinery used across various sectors, including transportation, construction, industrial, and military. These vehicles are engineered to handle substantial loads, endure harsh operating conditions, and perform heavy tasks. Examples include semi-trucks, dump trucks, cement mixers, garbage trucks, large buses, and military transport vehicles. Equipped with robust engines, reinforced chassis, and specialized components, these vehicles ensure durability, high performance, and reliability in demanding environments. Commercial heavy-duty vehicles, specifically, are defined as those designed for commercial, industrial, and construction purposes, typically with a gross vehicle weight rating (GVWR) exceeding 26,000 pounds (11,793 kilograms).

In the context of truck starter circuits, several factors influence performance and reliability. Initial starts are significantly more challenging than subsequent starts, primarily due to the lack of bearing lubrication, which increases friction and necessitates higher initial energy consumption. Starting a truck typically entails two to four seconds of cranking, during which the starter motor draws substantial current from the batteries. To reduce effective series resistance (ESR) and increase current, multiple batteries and cables are employed. This configuration is designed to provide current levels sufficient for reliable starting. However, even a small amount of battery drain can severely inhibit performance, underscoring the importance of maintaining optimal battery charge levels and battery health to provide sufficient power. Starter circuits operate with very little performance headroom, meaning that adverse conditions such as cold temperatures, partial battery charge, or electrical connectivity loss can substantially degrade starting performance.

The present applicant, Ox Partners LLC, has developed auxiliary power systems, which are a subject of U.S. Pat. Nos. 10,840,732 and 12,074,297. The auxiliary power system includes an auxiliary battery and circuitry that can be mounted within a vehicle and connected to its electrical system. This system is designed to address common issues such as dead batteries caused by auxiliary features drawing power when the engine is off or when the vehicle's alternator fails. The system can automatically detect a trigger event, such as a failed start attempt, and provide the necessary power to start the engine.

SUMMARY OF THE DISCLOSURE

The present disclosure describes a multi-voltage auxiliary power system for starting and jump-starting heavy equipment, such as semi-trucks, by delivering two or more discrete voltage levels, a continuously variable voltage, or a combination of both. By sensing a crank start event and automatically boosting voltage during the crank cycle, the system enhances starting reliability and efficiency, reducing operational delays and improving vehicle readiness.

This multi-voltage system can reduce or eliminate the need for multiple batteries typically connected in parallel in semi-trucks. Capable of replacing up to four or more standard Group 31 starter batteries, the system reliably supplies all necessary starting power, even in cold-weather conditions as low as −40° C. When the truck is off, internal electronic switches disconnect the battery from vehicle electronics, retaining starting capacity and reducing the need for jump-starting. For vehicles requiring continuous power to support electronics when the engine is off, a single lead-acid battery may be installed.

Voltage boosting during cranking provides twice-as-fast starts, reducing wear on the starter motor. Isolation from parasitic power drains ensures reliable starting capacity, eliminating the costs and downtime of jump-starting and negating the need for cut-off switches. The system's efficient starting capabilities also reduce diesel consumption by removing the need to idle the engine to avoid failed starts. The system further reduces weight and costs by replacing multiple lead-acid batteries. Additional features include a desulfation function to extend the life of any supplemental lead-acid battery used to power vehicle electronics, an internal heater for performance at low temperatures, and a lifespan on the order of 7-10 years, exceeding standard battery lifetimes. Example specifications include a weight of 15 lbs., 16.8V during cranking, 12V for regular operation, a peak current of 3,000 A, an operating temperature range of −40° C. to 85° C., compatibility with engines up to 18 L, and an IP67 environmental rating.

The auxiliary power system's design further supports real-time monitoring, with control circuitry capable of providing telemetric data on battery health and location to remote monitoring systems, optionally augmented by GPS. For user interaction, an integrated interface displays system states and provides battery health updates. A pre-charge function applies a voltage high enough to charge the battery or batteries for more efficient cranking by preparing the battery or batteries to assist in the cranking or by preventing them from loading down the starting circuit. Method steps detailed in the disclosure include detecting a cranking event, applying high voltage during cranking, switching to nominal voltage post-crank, and isolating the battery when the equipment is off to prevent parasitic power drain. Further features include over-the-air firmware updates via cellular, Bluetooth, or other wireless protocol, and an internal heating element for low-temperature operation. Altogether, this multi-voltage auxiliary power system addresses the specific demands of heavy-duty equipment by ensuring reliable starts, remote monitoring, efficient power management, and versatility across various configurations, maintaining consistent performance across diverse environments while minimizing downtime and maintenance requirements.

Further aspects and advantages of the multi-voltage auxiliary power system will be apparent from the detailed description of embodiments provided in conjunction with the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 3 is a table showing conditions for entering and exiting the modes of operation of FIG. 2 in accordance with one embodiment.

DETAILED DESCRIPTION OF EMBODIMENTS

Figure 1:
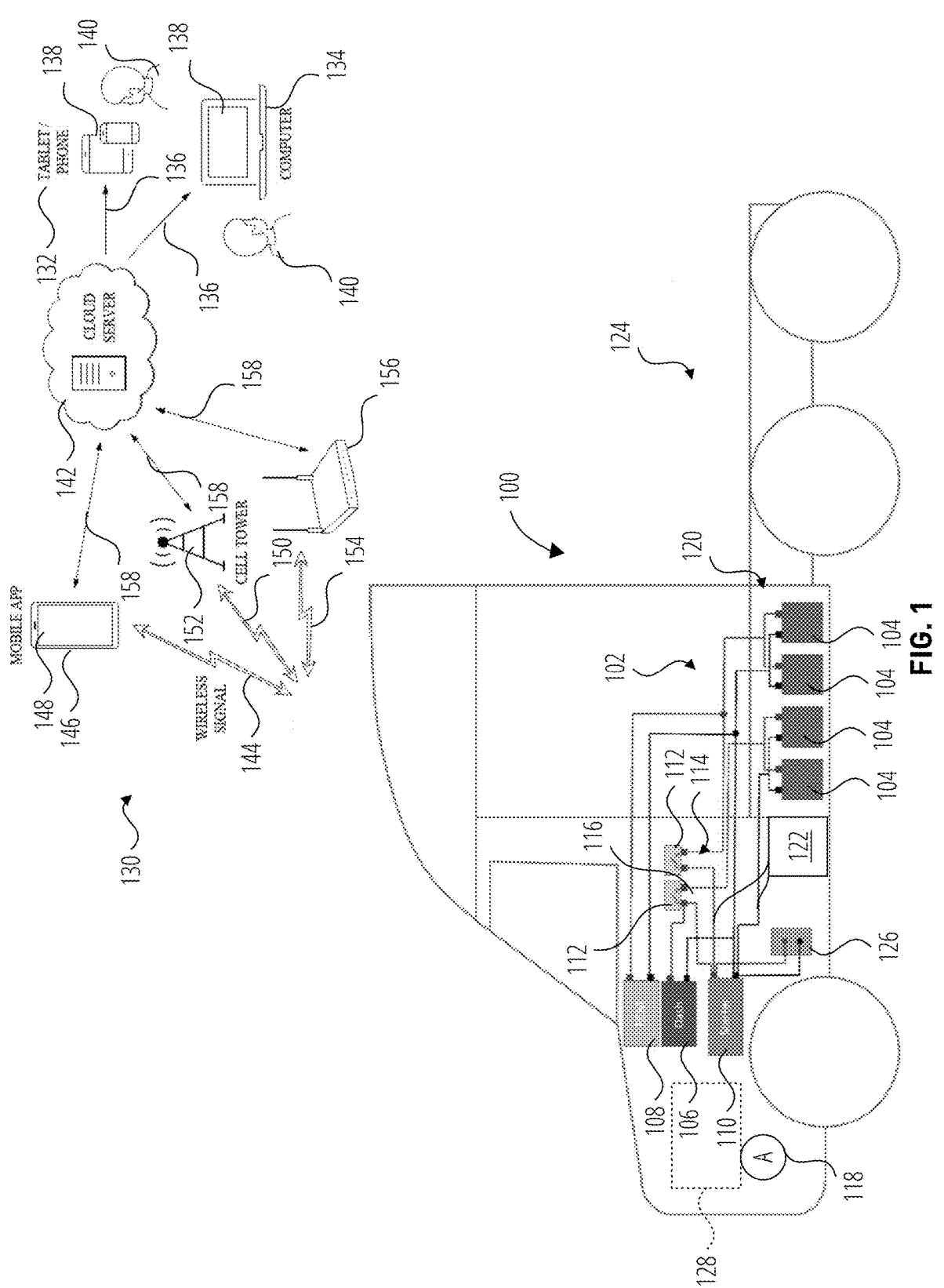
FIG. 1 is a block diagram of a starting and battery system in a truck equipped with a multi-voltage auxiliary power system in accordance with one embodiment.

FIG. 1 shows an example of a truck 100 with a starting and battery system 102. A starter battery or battery group (batteries 104) in a vehicle is typically comprised of one or more batteries with a combined voltage of either 12V or 24V when not under load (although other voltages are possible). For instance, one battery configuration often used in heavy equipment is where two 12V batteries are connected in series to produce 24V. Increasing the battery voltage generally is more effective in starting vehicles, provided the battery or battery group ESR is relatively low. 24V battery groups are typically not used in semi-trucks because the electronic systems are designed to operate at 12V.

Another battery configuration used in semi-trucks includes four 12V lead-acid batteries connected in parallel to provide a 12V connection to the vehicle electronics when not under load due to cranking. In some embodiments, these batteries have a single connection to the vehicle electronics and starting system. In other embodiments, such as that shown in FIG. 1, batteries 104 have two parallel connections to an electronics unit 106, an engine control module (ECM) 108, and a starter 110, which typically provides a lower resistance connection, and hence lower voltage drop, to the starter motor during cranking. Other battery configurations are possible, including the use of fewer than four batteries.

In general, increasing the number of batteries connected in parallel reduces the ESR of the battery group, which in turn reduces the voltage loss across the battery group and allows more power to reach the starter motor. Thus, multiple batteries connected in parallel are used in large vehicles to reduce the ESR of the battery group, thereby maximizing current during cranking. For instance, if each lead-acid battery in a four-battery group has an ESR of 5 milliohms, then the ESR of the group would be 1.25 milliohms (assuming negligible interconnection resistance between the batteries). To illustrate the benefit of additional batteries in starting a large vehicle, consider a semi-truck that has a starter with a starting resistance of 2.75 milliohms (the resistance when the starter has not yet started rotating) and 2 milliohms of resistance in the cables and connectors between the battery group and the starter. With a single 12V battery connected to the vehicle electronics, the peak starting current would be approximately 1,231 A, calculated as follows:

$$\text{Peak Current} = \frac{12}{0.00275 + 0.002 + 0.005} = 1{,}231 \text{ A} \qquad \text{Equation 1}$$

This current corresponds to a peak power of 4,166 W delivered to the starter, determined by:

$$\text{Peak Power} = 1{,}231^2 * 0.00275 = 4{,}166 \text{ W} \qquad \text{Equation 2}$$

By contrast, with four batteries connected in parallel, the peak current would increase to 2,000 A, delivering a peak power of 11,000 W to the starter.

With a conventional battery configuration, the trucking industry faces significant challenges related to the reliability of vehicle starting systems. One pressing issue is the frequent occurrence of batteries 104 becoming weak or dying while truck 100 is parked or stored. Even healthy lead-acid batteries tend to discharge below a useful level in a few weeks, while older batteries deplete even faster if truck 100 is not started due to parasitic current draws by vehicle electronics unit 106. This problem often necessitates the installation of cutoff switches 112, which, despite incurring an additional cost of approximately $400 per unit, marginally extend battery life and degrade the starting performance of truck 100. For instance, the installation of cutoff switches 112 typically introduces an additional 0.500 milliohms of resistance (i.e., additional to 0.500 milliohms resistance in wiring 114 and 116). This results in a power loss of approximately 2 kW at 2,000 A, thereby further straining starting and battery system 102. These issues result in a persistent inability to reliably start truck 100 at any given time.

Although a jump starter (not shown) operating at a relatively high voltage (compared to the 12V nominal voltage of starting and battery system 102) may initially succeed in starting truck 100, truck 100 may fail to continue running once that jump starter is disconnected from very weak batteries. For instance, an 18 AH lithium-cobalt-based jump starter operating at 16.8V will provide about 3,000 amps in a typical semi-truck, which is effective in starting the vehicle. However, because an alternator 118 typically will not activate if the voltage supplied by starting and battery system 102 is over a certain threshold (about 14 to 15V) and ECM 108 typically requires a minimum of about 8V to operate, the vehicle would not continue running when the jump starter is disconnected without alternator 118 running if the vehicle battery is below the minimum voltage required to operate ECM 108.

This scenario typically requires charging batteries 104 for an extended period, ranging from four to eight hours, to bring the battery voltage above the minimum operational voltage of ECM 108, causing considerable delays. Additionally, accessing batteries 104 themselves poses a significant challenge, as opening a battery box 120 is often cumbersome. As a result, there is a frequent need to replace all four batteries 104 rather than investing time in charging the existing ones. These specific issues are reflective of the core problem of truck starting unreliability, which disrupts operations, incurs additional costs, and necessitates frequent maintenance and replacements.

Accordingly, FIG. 1 shows an example of a multi-voltage auxiliary power system 122 specifically designed for industrial applications, such as semi-trucks, which aims to address these challenges. In FIG. 1, multi-voltage auxiliary power system 122 is integrally installed in truck 100, i.e., mounted near batteries 104 (e.g., in a storage bay or in the battery compartment) and connected to a pair of battery cables 124. In another embodiment, multi-voltage auxiliary power system 122 is fully packaged in a standard Group 31 battery housing (see e.g., FIG. 14) and mounted as one of batteries 104. In yet another embodiment, multi-voltage auxiliary power system 122 is removably coupled via a jump start port 126 or other appropriate electrical connection. Thus, the disclosed systems can be configured as a stand-alone jump pack, as a dockable system (see, e.g., the '297 patent) that mounts in vehicle and can be removed, which may also have an ability to connect to other vehicles (for instance with jumper cables or a docking station). System 122 may also be comprised using an external battery, or batteries, instead of internal batteries, such as two standard 12V lead acid batteries connected in series.

With multi-voltage auxiliary power system 122, the total number of lead-acid batteries 104 may be reduced from four to three, two, or even one. Moreover, if multi-voltage auxiliary power system 122 is designed with sufficient capacity and sufficiently low ESR, it may be able to supply all required starting power for truck 100, effectively eliminating the need for any lead-acid batteries. However, with other batteries in starting and battery system 102, multi-voltage auxiliary power system 122 may disable its output power when truck 100 is not running to prevent its internal batteries 104 from becoming discharged due to parasitic draws from electronics unit 106. Therefore, in a typical installation, one or more lead-acid batteries would be used to maintain power to electronics unit 106 when engine 128 is not running.

By sensing when there is a crank start of a starter motor (or simply, starter) 110 and subsequently increasing the voltage applied thereto, this solution enhances the reliability and efficiency of truck starting systems, ultimately improving operational readiness in the trucking industry. Thus, multi-voltage auxiliary power system 122 is configured to boost power to starter 110 to provide considerably faster and more reliable starts, automatically jump-start an engine 128 if batteries 104 are too weak to start truck 100, and keep engine 128 running after the jump start until batteries 104 are sufficiently charged to sustain truck operation. If the embodiments are used in conjunction with other lead acid batteries, the current it provides during the cranking cycle will depend on its output voltage, ESR, and the voltage and ESR of the lead acid batteries. In typical embodiments, most of the cranking current is provided by system 122 and thereby greatly reduces the demand on the lead acid batteries, meaning the lead acid batteries will have a much longer useful lifetime because they need not perform to the level of new or fully healthy batteries.

In the example of FIG. 1, multi-voltage auxiliary power system 122 provides at least two voltages: nominally 16V to 18V during cranking (voltages outside this range may also be suitable) and nominally 12V to run truck electronics (e.g., ECM 108, electronics unit 106) when engine 128 is not cranking. The voltage during cranking may be any reasonable voltage higher than 12V to achieve more efficient power transfer to starter 110 during the crank. Since the currents are higher during the crank, the high-current voltage drop causes the voltage reaching electronics unit 106 to be less than the output voltage and at a safe voltage level for the vehicle electronics. To support these functions, multi-voltage auxiliary power system 122 determines the following states of truck 100, as described later in greater detail with reference to FIG. 2 and FIG. 3: key in off position; key in ACC position, engine off; key in on position, engine off; key in on position, engine running; and key in start position, engine cranking. Note, if the truck has a push button or other method of activation instead of a key, system 122 will automatically recognize the equivalent vehicle state for each of the aforementioned named key positions.

Multi-voltage auxiliary power system 122 optionally provides telemetric data on vehicle battery health, operational parameters, system location, firmware status, and other information via SMS text, URL or other platforms (e.g., communicating via cellular communications) for a monitoring system 130. Telemetric data refers to the information collected and transmitted by multi-voltage auxiliary power system 122 from locations that are remote from monitoring system 130 for analysis and monitoring. This data is gathered for real-time decision-making, predictive maintenance, and performance optimization.

Monitoring system 130 allows for remote monitoring by persons using smart devices 132, like tablets and phones, or using workstation remote monitoring 134. These devices can access real-time data and historical records through internet connection 136, providing a comprehensive view of starting and battery system 102. A SaaS application presents a user interface 138 that enables an employer or monitoring person 140 to set parameters for and monitor the status of all devices. For instance, monitoring system 130 provides SMS text alerts to users including: charge level and health of the vehicle battery; if a jump-start was automatically initiated; if ambient temperature drops below a pre-settable threshold; GPS location, vehicle license plate, vehicle battery level, etc., in response to SMS text, mobile app, or URL inquiry; if firmware updates are available; or other critical updates.

Certain system parameters, such as user telephone number, vehicle owner, and vehicle license plate, may be programmed via URL. Over-the-air (OTA) firmware updates may be transmitted over the cellular network or alternatively via Bluetooth if the user is not subscribed to the cellular network. In some embodiments, multi-voltage auxiliary power system 122 includes an optional certified GPS module and an optional certified BLE Bluetooth module, or other wired or wireless device for programming certain parameters such as user telephone number, vehicle owner, and vehicle license plate. In some embodiments, multi-voltage auxiliary power system 122 also includes a firmware authentication method to prevent unauthorized use of firmware. Future updates will be compatible with 802.11 and 802.15.4 Wi-Fi and CAN bus for possible future upgrades, in some embodiments.

For instance, multi-voltage auxiliary power system 122 transmits data to a remote server 142 via an integrated wireless communications device. In some embodiments, the data is transmitted through a wireless personal area network (WPAN) connection 144 (e.g., Bluetooth) to user equipment 146, such as a smartphone having a mobile app 148 used by a driver of truck 100. In other embodiments, data from multi-voltage auxiliary power system 122 is sent via a cellular wireless wide area network (WWAN) connection 150 facilitated by a cellular access system 152. Alternatively, data is uploaded through a wireless local area network (WLAN) connection 154 via a Wi-Fi router 156 and associated networking equipment including terrestrial or non-terrestrial networking equipment. The data is uploaded to remote server 142 over an internet connection 158. If no network connection is available, multi-voltage auxiliary power system 122 or mobile app 148 stores the data locally and uploads it when a connection is re-established.

Figure 2:
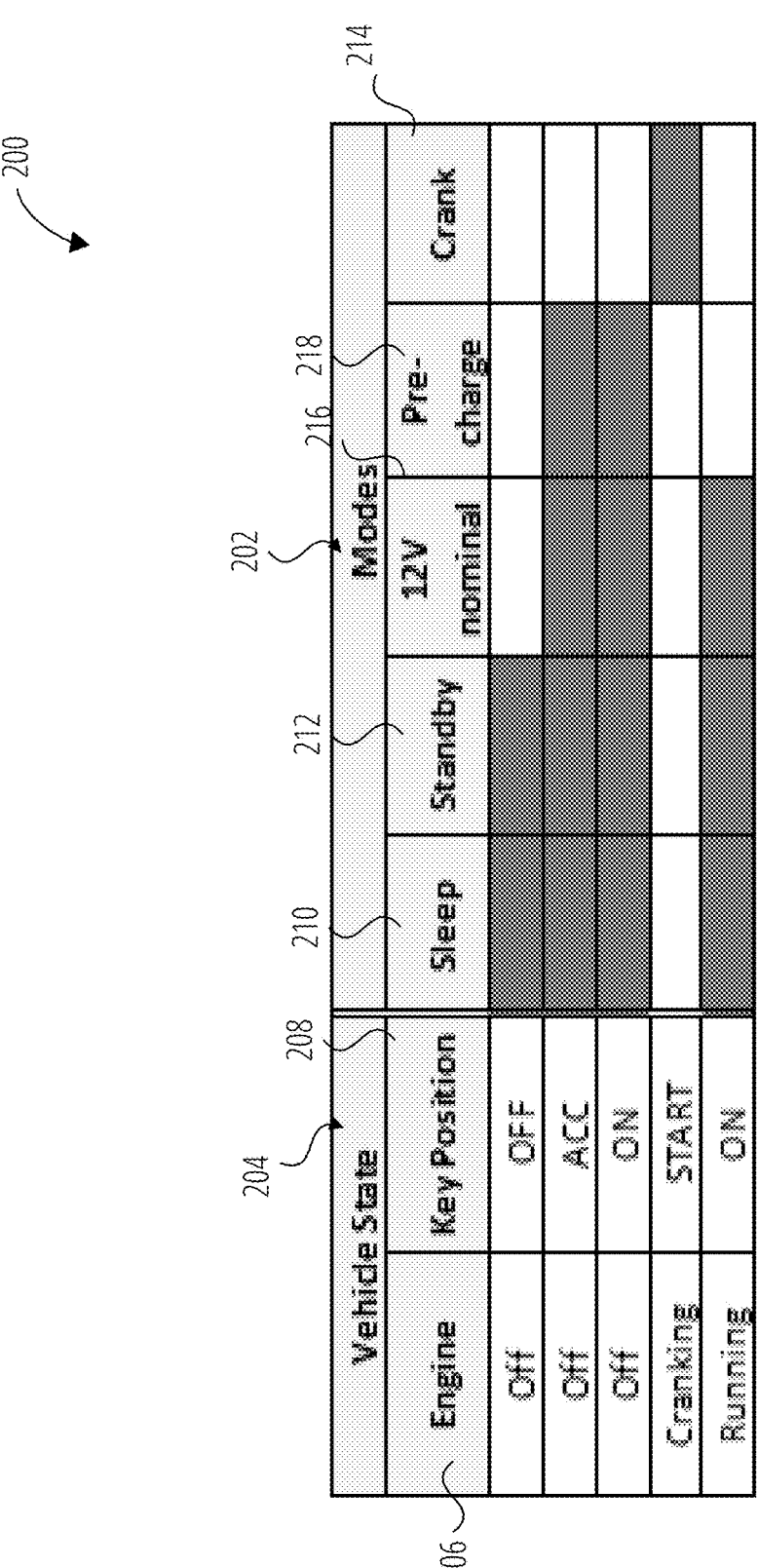
FIG. 2 is a table showing modes of operation for the multi-voltage auxiliary power system of FIG. 1 in accordance with one embodiment.

FIG. 2 is a table 200 showing some modes of operation 202 that multi-voltage auxiliary power system 122 performs based on a vehicle state 204. In this example, vehicle state 204 is defined by the status of the vehicle's engine state 206 and key position 208. Example vehicle states 204 are described as follows. It should be noted, however, that vehicle state 204 may depend on other types of ignition systems (e.g., pushbutton start) and not all modes 202 are required for all embodiments.

In this example of FIG. 2, the vehicle is started using a key or ignition switch which typically has the following positions or modes: OFF, ACC, ON and START (push button or other switch configurations are also possible).

When the key is in the OFF position, the majority of the vehicle systems are off, however, some power may be provided by vehicle batteries to maintain low-level function some systems (e.g. clock, radio and ECM settings).

When the key is in either the ACC or ON position, power is provided to certain system electronics, but the vehicle engine will only run while the key is in the ON position after the engine is started with the key monetar momentarily placed in the START position.

When the key is in the START position, power is sent to the starter motor in addition to the electronics systems.

Typically, when the key is in the ON or ACC position, the current supplied by the battery or battery group will be low enough that there is very little voltage drop across the electrical connections leading to the electronics and the voltage reaching the electronics is effectively the same as the battery or battery group voltage.

However, when the key is in the START position and a crank is initiated, a large amount of current is supplied to the starter causing voltage drops across the starter battery or battery group, due to their internal resistance, and across the vehicle cables. Therefore, the voltage reaching the vehicle electronics, and the starter will be less than the battery or battery group's unloaded terminal voltage.

Multi-voltage auxiliary power system 122 has the following five modes of operation 202. Other modes could include a mode to desulphate the vehicle lead acid batteries, a mode to measure the ESR or other characteristics of the vehicle batteries. Some embodiments may have variations to the modes described below.

Sleep mode 210 is a low-power mode where all subsystems are turned off except those required to monitor vehicle voltage and any other system required for operation, such as a periodic wireless connection to an optional remote-control device, or a periodic cellular connection. Other functions may be activated during sleep mode 210, such as activating the system to charge the internal battery.

Standby mode 212 is when all subsystems are powered on and ready for use. The output voltage is deactivated, but multi-voltage auxiliary power system 122 charges if the engine is running and charging is required. Multi-voltage auxiliary power system 122 may time out from standby mode 212 to sleep mode 210 when no action (such as cranking, switching modes, charging, cellular communications, OTA firmware updates, etc.) is initiated after a pre-determined amount of time. Multi-voltage auxiliary power system 122 will exit standby mode 212 and enter crank mode 214 when a cranking event is detected.

12V nominal mode 216 provides nominal 12V power to the vehicle electronics for a period before cranking is initiated and for a period after a jump start. Post successful jump-start, the voltage may be adjusted to minimize drain on the internal battery while maintaining adequate system voltage to keep the engine running.

Pre-charge mode 218 provides a voltage higher than 12V to the vehicle batteries, if present, to pre-charge them for a start assist or jump but remains within safe limits for vehicle electronics. This mode times out after a predetermined period or when the vehicle batteries no longer need pre-charging. It is assumed that pre-charge mode 218 would leverage an intermediate voltage between 12V and a higher cranking voltage (typically 16V to 18V but higher voltages up to the cranking voltage could be used). In scenarios where circuitry allows for just two voltages, pre-charge mode 218 and 12V nominal mode 216 would be combined.

Crank mode 214 provides high voltage and high current output for enhanced starting and jump-starting while the starter motor is engaged. Due to system voltage losses, voltage applied to the vehicle electronics remains within the normal operational range.

FIG. 3 is a table 300 describing in greater detail condition for entering and exiting each mode of operation 202 during operation of multi-voltage auxiliary power system 122. Multi-voltage auxiliary power system 122 automatically switches between states in accordance with the conditions in table 300 by detecting changes in the system voltage level or from information provided by the vehicle electronics, from the CAN bus, or other source. If no external vehicle battery is installed to provide voltage to be monitored, a voltage (ideally current limited) may be provided by multi-voltage auxiliary power system 122.

Figure 4:
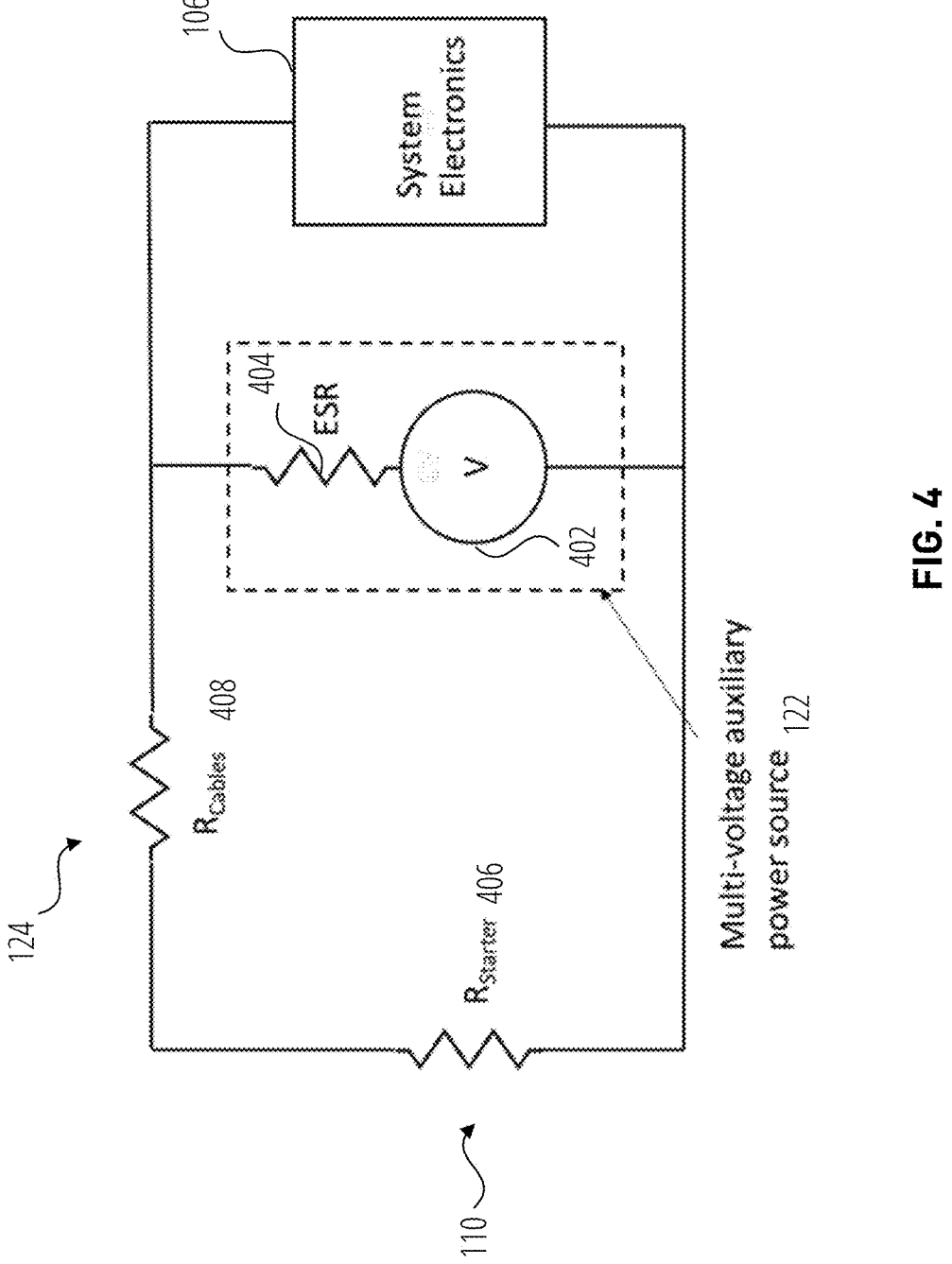
FIG. 4 is a simplified electrical schematic of the multi-voltage auxiliary power system shown in FIG. 1.

FIG. 4 shows a schematic of major components of starting and battery system 102, with a starter battery substituted with multi-voltage auxiliary power system 122 (modelled electrically as an ideal voltage source 402 in series with an ESR 404). This schematic is equivalent to how a vehicle system with a group of lead acid batteries is modeled, assuming multi-voltage auxiliary power system 122 would be replaced with voltage and ESR values of the lead acid starter battery or battery group.

Consider a vehicle which has an initial starter series resistance 406 (just before it starts rotating) of 2.65 milliohms, cabling resistance 408 (including connections) of 2 milliohms, and multi-voltage auxiliary power system 122 producing 16.8V with ESR 404 of 2 milliohms. Assuming no additional external lead acid batteries are connected, in this scenario multi-voltage auxiliary power system 122 will provide a peak cranking current of approximately 2,526 A causing a 5.05V drop across ESR 404 resulting in a voltage of 11.75V being supplied to electronics unit 106 and 16,913 W of peak power supplied to starter 110.

As a comparison, consider the same truck, but instead of multi-voltage auxiliary power system 122, it has a group of four lead acid batteries connected in parallel, each with 5 milliohms of ESR, for a net battery group ESR of 1.25 milliohms. In that case, the peak cranking current would be 2,033 A with 9.46V being supplied to the system electronics and 10,962 W supplied to starter 110.

The additional power supplied to starter 110 from multi-voltage auxiliary power system 122 results in a significant reduction of start time, less total energy required to start the vehicle, and therefore less wear and tear on the starter motor.

Because multi-voltage auxiliary power system 122 has more performance headroom due to the higher voltage producing higher current, and because less total energy is required to start engine 128, multi-voltage auxiliary power system 122 internal batteries function with less internal capacity than in traditional lead-acid battery groups. For instance, a typical Group 31 semi-truck battery may have 100 Ah of capacity, so a battery group with four batteries would have a total capacity of about 400 Ah. If it requires 4 Ah at 12V to start the truck, it might be inferred that the batteries could provide up to 100 starts before recharging the batteries. However, as the batteries discharge, the terminal voltage drops and the ESR increases, causing the peak current to decrease, which causes the start times to increase which in-turn increase the amount of energy required for successive starts. Therefore, long before the batteries are fully depleted of charge, they are no longer capable of starting the truck so the number of starts that can be provided by an initially fully charged group of batteries is quite limited.

In contrast, multi-voltage auxiliary power system 122 has higher performance headroom due to the higher voltage and higher current, and because less energy is expended for each start, much less internal battery capacity is specified. Furthermore, some battery chemistries, like Lithium Iron Phosphate, maintain much more of their terminal voltage as the charge depletes. Therefore, much smaller lighter weight internal batteries can be used. For instance, a 24 AH 16.8V Lithium Iron Phosphate battery which can start a vehicle with about 1 AH at 16.8V, may in fact provide more starts than a group of four lead acid batteries.

In order to provide maximum peak current during cranking, one embodiment provides a low resistance switched connection between the internal battery and multi-voltage auxiliary power system 122 output. This may be accomplished using multiple back-to-back MOSFET pairs in parallel as the switching element (eliminating a use for cutoff switches 112, FIG. 1). The nominal 12V output is used to power the vehicle electronics during certain times when not cranking the engine that does not need to provide as high of current, typically 50 A to 100 A will suffice. As such, a well-designed DC-to-DC converter in the form of a buck converter or a buck-boost converter can be used to convert the higher voltage internal battery to the nominal 12V. The output can be fixed, selectable to certain discrete values, or variable.

Figure 5:
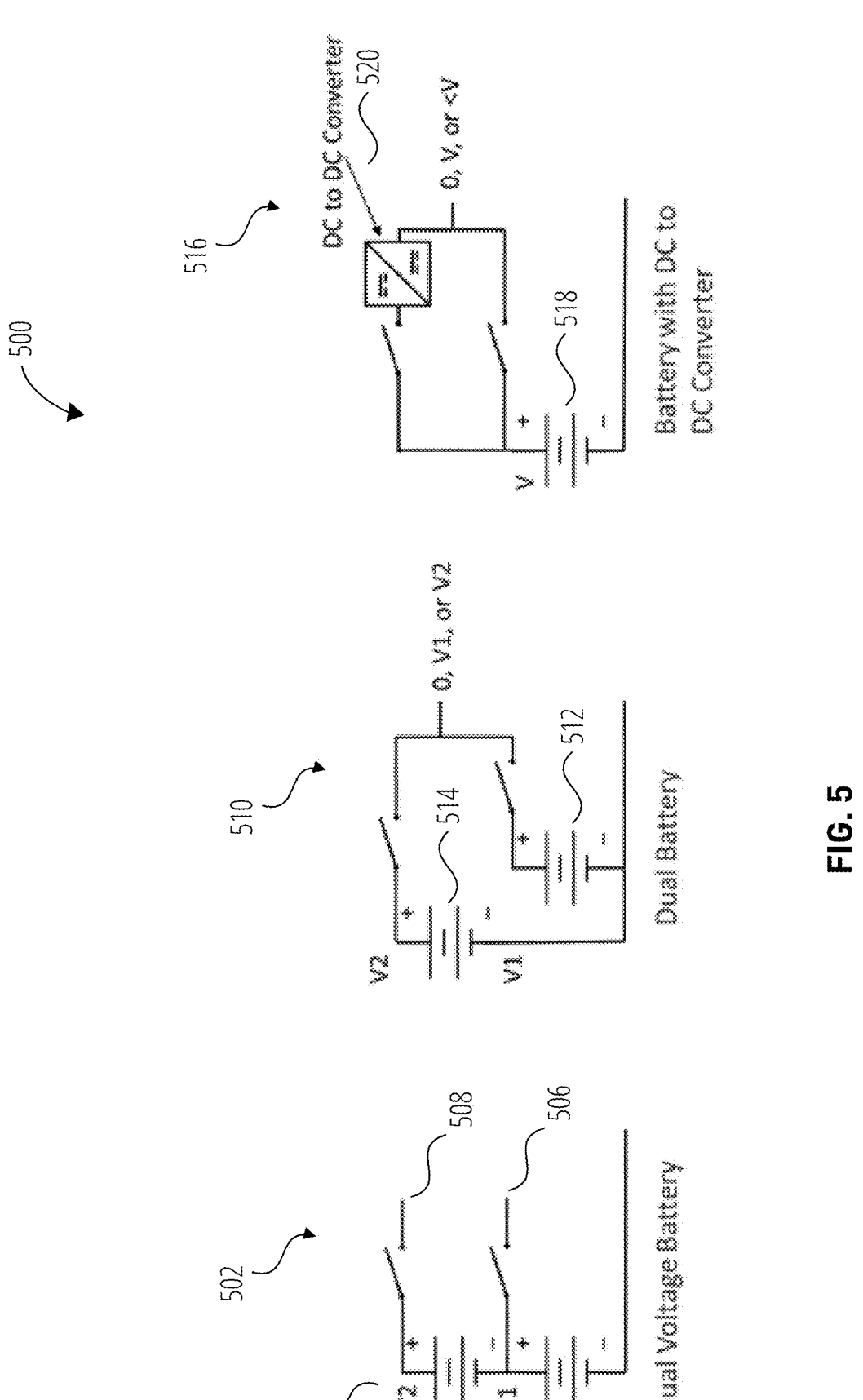
FIG. 5 is a set of three schematics for different multi-voltage circuits in accordance with three different embodiments.

FIG. 5 shows examples of three electrical schematics 500 for generating a multi-voltage output from multi-voltage auxiliary power system 122. These embodiments demonstrate different methods for achieving multiple voltage outputs to meet the needs of vehicle starting and operational systems.

In a first embodiment, a dual voltage battery 502 includes a single battery pack 504 with a first output 506 (V1) and a second output 508 (V2). This configuration allows the system to provide two distinct voltages from battery pack 504. The dual voltage battery setup enables the system to seamlessly switch between a higher voltage output for cranking the engine and a lower voltage for powering the vehicle's electronics. By incorporating multiple outputs within single battery pack 504, this embodiment simplifies the design and reduces the overall footprint of the power system, making it compact and efficient.

In a second embodiment, dual batteries 510 include a first battery 512 (V1) and a second battery 514 (V2) that have different voltages from each other. This setup enables the system to switch between two different batteries to provide the required voltage. The dual battery configuration allows for greater flexibility in managing power requirements. For instance, one battery can be dedicated to starting the engine with a higher voltage, while the other provides a stable lower voltage for the vehicle's electronic systems. This separation can enhance the reliability and longevity of the batteries by optimizing their use according to their specific capacities and discharge characteristics.

In a third embodiment, a battery with selectable output 516 includes a direct connection to a battery 518 and a connection to a DC-to-DC converter 520 (e.g., a buck converter, a boost converter, or a buck-boost converter) to provide a fixed or variable voltage output which is different from the voltage of battery 518. This third embodiment maximizes the available battery capacity for either operational mode, uses fewer MOSFETs, and provides a variable voltage output. The inclusion of DC-to-DC converter 520 allows for precise control of the output voltage, enabling the system to adapt to varying power demands. This approach is particularly useful in scenarios where different components of the vehicle require specific voltage levels for optimal performance. However, the current handling capability of DC-to-DC converter 520 is less than that of the direct connection, and it is more complex than the other embodiments to provide the low voltage mode. Despite the increased complexity, this configuration offers significant advantages in terms of versatility and efficiency, making it suitable for advanced vehicle power systems.

Each of these embodiments in FIG. 5 offers unique advantages depending on the specific requirements of the vehicle's electrical system. By providing multiple methods for generating variable voltage outputs, multi-voltage auxiliary power system 122 ensures that it can meet the diverse needs of different vehicle configurations and operational conditions.

Figures 6, 7:
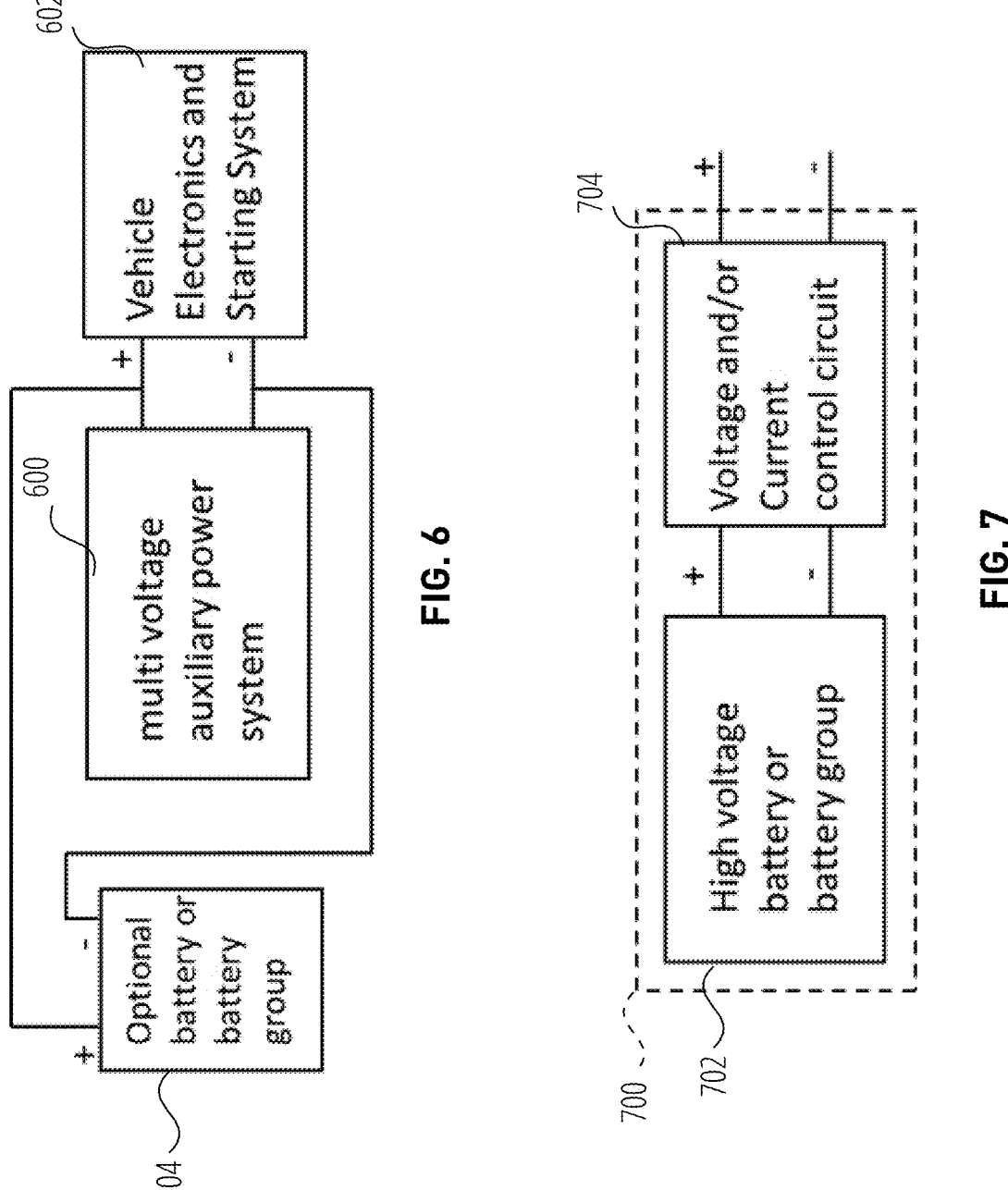
FIG. 6 is a block diagram of an implementation of the multi-voltage auxiliary power system shown in FIG. 1.
FIG. 7 is a block diagram of a multi-voltage auxiliary power system in accordance with one embodiment.

FIG. 6 shows an embodiment of a multi-voltage auxiliary power system 600 connected to vehicle electronics and starting system 602 and an optional battery or battery group 604. The embodiment of FIG. 6 typically provides no power when ignition is in the off position (but optional battery or battery group 604 would be present), but provides nominal 12V power to the electronics when before the engine is started and when it is running, and a higher voltage power during when the engine is starting, or cranking, to overcome the voltage loss in the cables and the batteries and provide more power to the starter motor. Because of the voltage losses in the system, the voltage provided to the vehicle electronics are within the safe operating range. The optional battery 604 can provide power to the vehicle electronics when the embodiment output is turned off, and may provide some power during cranking. The components and subsystems of multi-voltage auxiliary power system 600 may be integrated into a single system, as an example incorporated into a standard Group 31 battery, or the components and subsystems may be physically separated, as an example electronics enclosed separately from the batteries.

FIG. 7 shows a multi-voltage auxiliary power system 700 in which a battery or battery group includes a high voltage battery 702 and a voltage and/or current control circuit 704. In this embodiment, the maximum output voltage will match that of the battery and will be provided while the engine is cranking. When not cranking, the voltage will be reduced to provide power to the electronics or will be turned off.

Figures 8, 9, 10:
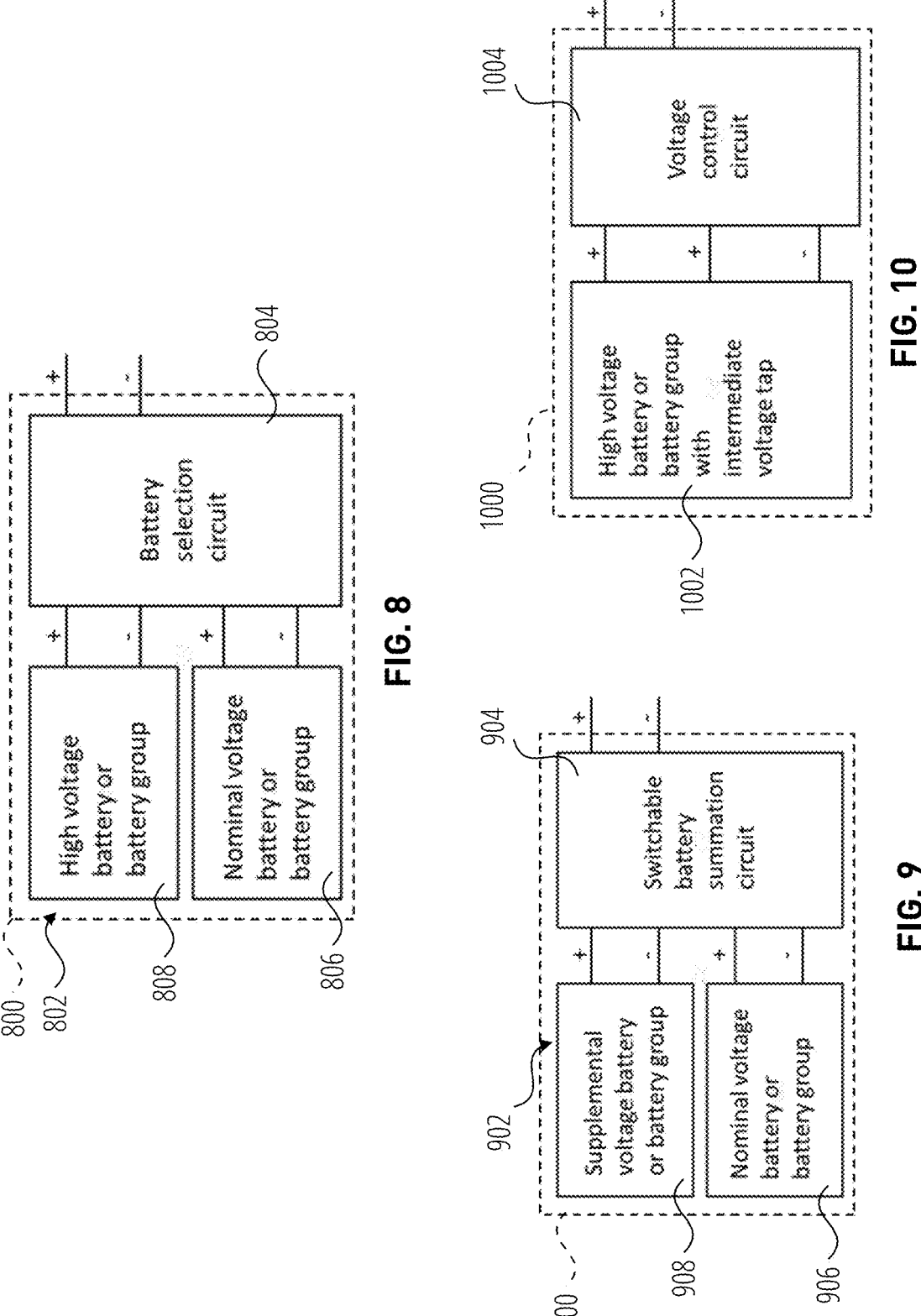
FIG. 8 is a block diagram of a multi-voltage auxiliary power system in accordance with one embodiment.
FIG. 9 is a block diagram of a multi-voltage auxiliary power system in accordance with one embodiment.
FIG. 10 is a block diagram of a multi-voltage auxiliary power system in accordance with one embodiment.

FIG. 8 shows a multi-voltage auxiliary power system 800 that uses two internal batteries 802 and a battery selection circuit 804. In this embodiment, battery selection circuit 804 connects a nominal voltage battery or battery group 806 to the output to provide power to the vehicle when the engine is not cranking and connects a high voltage battery or battery group when the engine is cranking.

FIG. 9 shows a multi-voltage auxiliary power system 900 that uses two internal batteries 902 and a battery summation circuit 904. In this embodiment, the power from a nominal voltage battery or battery group 906 is connected to the output when the engine is not cranking but a supplemental voltage battery or battery group is connected in series with the nominal voltage battery or battery group to increase the voltage during crank.

FIG. 10 shows a multi-voltage auxiliary power system 1000 that uses a single battery with a battery tap 1002 at an intermediate location between the series connection between some of the cells. The intermediate tap provides the nominal voltage to power the electronics when the engine is not cranking and the high-voltage tap, corresponding to the full battery voltage, is selected by a voltage control circuit 1004 during the crank.

FIG. 11-FIG. 16 show an example of internal components 1100 for multi-voltage auxiliary power system 122 or multi-voltage auxiliary power system 700. The components include a negative output 1102, a positive output 1104, control circuit PCBA busbars 1106, MOSFET circuit busbars 1108, a battery group 1110, a MOSFET switch circuit PCBA 1112 with switches 1114, a UI/connectivity circuit PCBA 1116, a control circuit PCBA 1118, and battery management system (BMS) circuits 1120. Although the circuitry is implemented as specific PCBAs in this example, other implementations are also possible.

These components are mounted in a housing having an internal chassis (see, e.g., FIG. 15) for assembling battery group 1110 and circuit boards into a fully operational sub-assembly that installs into an outer housing. In some embodiments, the internal components are mounted into a chassis, which is injection molded, and then mounted into outer housing. This "box in a box" results in a rigid structure and allows all system functions to be tested through burn-in before installing the sub-system into its outer housing. This allows for re-work without needing to open a single external housing, and for a simple way to private label the product with customized outer housings.

Flexible negative output terminals 1102 and flexible positive output terminals 1104 are coupled to, respectively, control circuit PCBA busbars 1106 and MOSFET circuit busbar 1108. This allows for compact construction and provides a high degree of compliance. The design of control circuit PCBA busbars 1106 and MOSFET circuit busbars 1108 balances the resistive paths from each battery (in a multi-battery system). Otherwise it was shown that one battery could become drained more than the other.

Battery group 1110 employs two custom 16.8V 12 AH LiFe 5S2 P batteries constructed with 6 AH cells, however other battery types and/or voltages higher than a 12V nominal voltage may be used in other embodiments. Each battery employs an optional thin film heater sandwiched between the cells, according to some embodiments to heat the battery to normal operating temperature if required due to cold ambient temperture. The power to heat the batteries can be drawn from the external lead acid battery or batteries if present, or from battery group 1110. The battery temperature is monitored with one or more thermistors integrated into battery group 1110. The LiFe batteries in this embodiment must be above 32 degrees Fahrenheit before being charged. Therefore, if the battery temperature is less than 32 degrees F., the heater circuit will activate and heat the batteries to at least 32 F before charging battery group 1110. Batteries in general lose capacity and ability to supply high current when very cold. Prior to cranking, the heater may be activated to warm battery group 1110 to ensure they can provide sufficient current to start the vehicle. In general, battery group 1110 can supply sufficient power to the thin film heaters to bring the batteries to good operating temperatures and have sufficient remaining power to start the vehicle.

Figure 13:
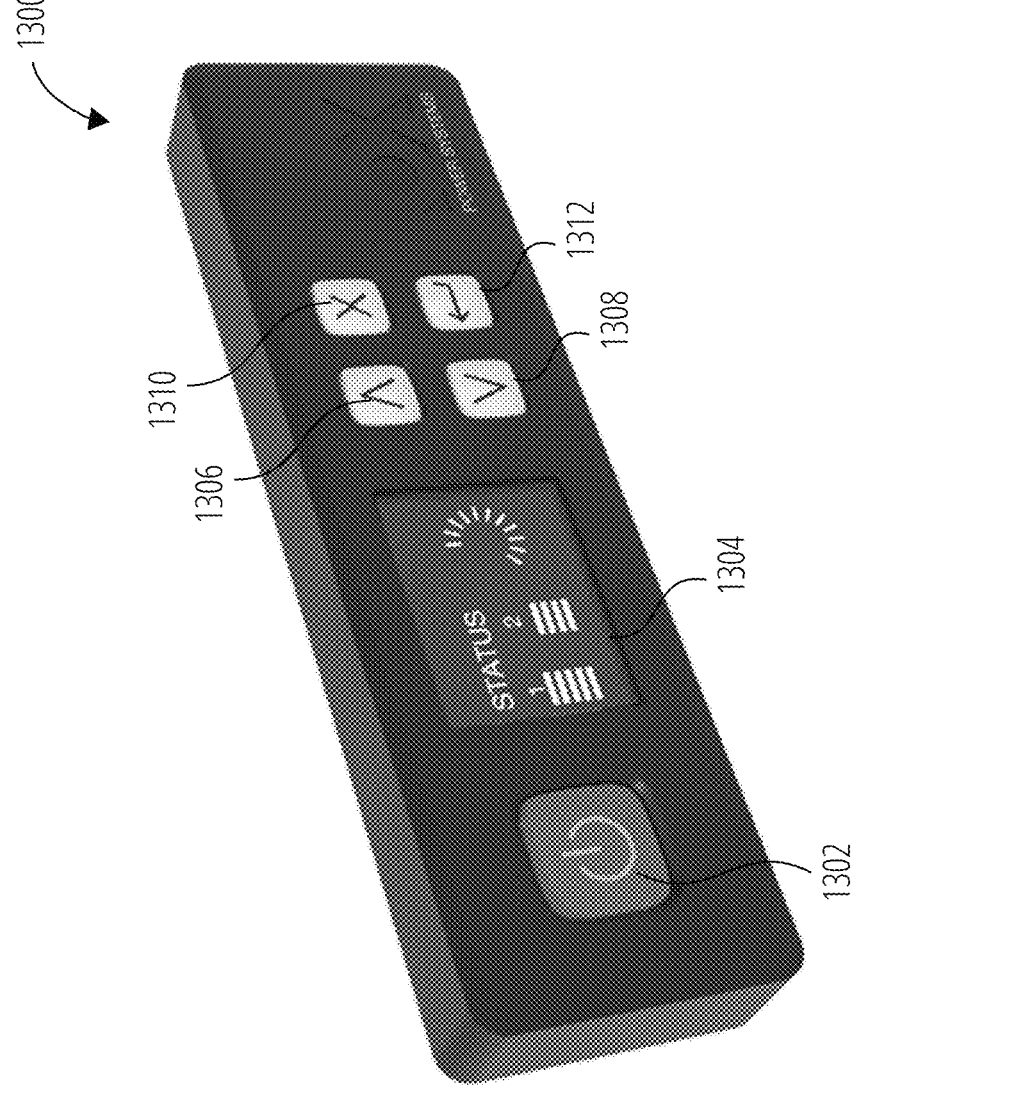
FIG. 13 is a pictorial view of a user interface display.
Figures 14, 15:
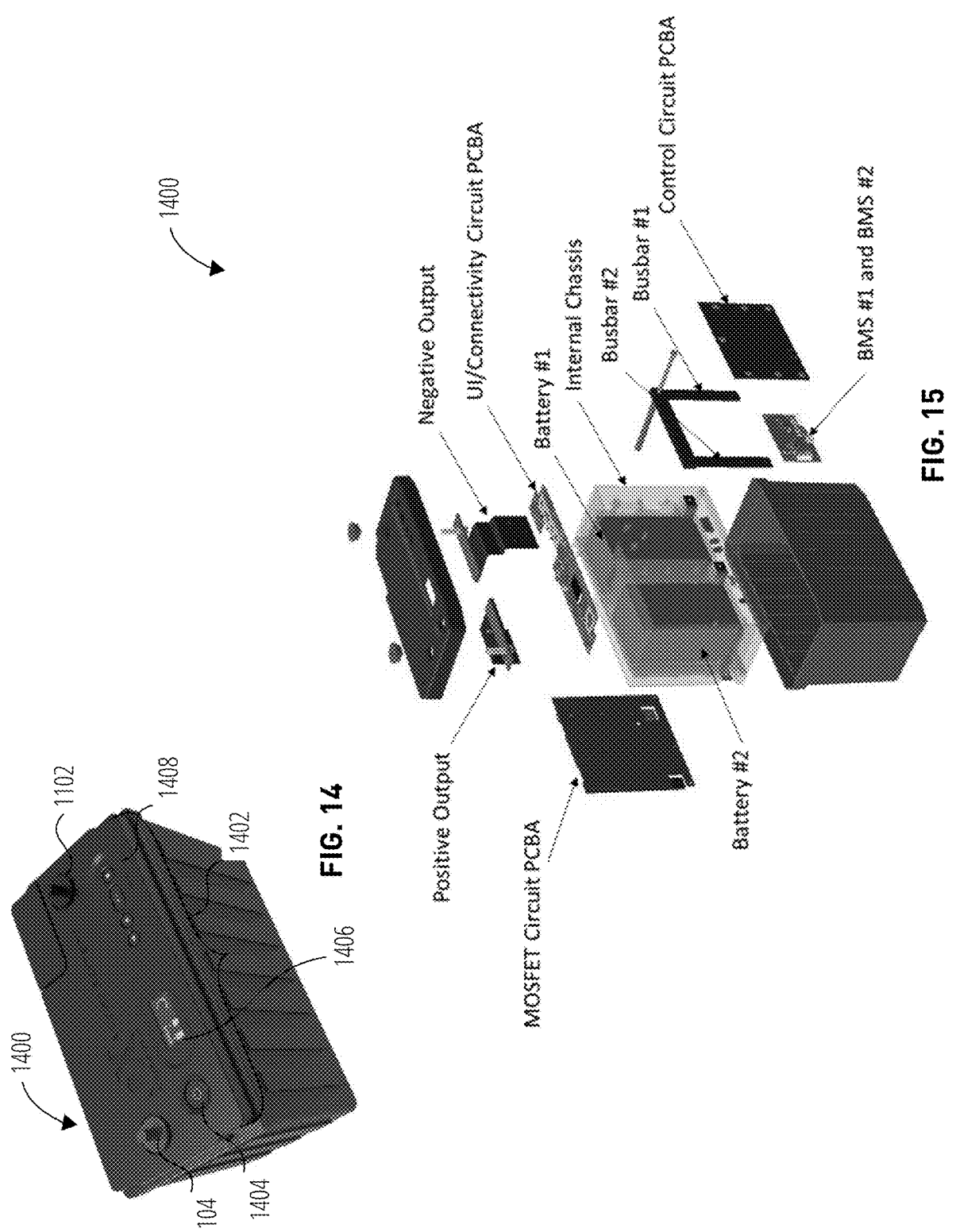
FIG. 14 is a perspective view of internal components packaged in a modified Group 31 battery form factor.
FIG. 15 is an exploded view of the modified Group 31 battery form factor.
Figure 16:
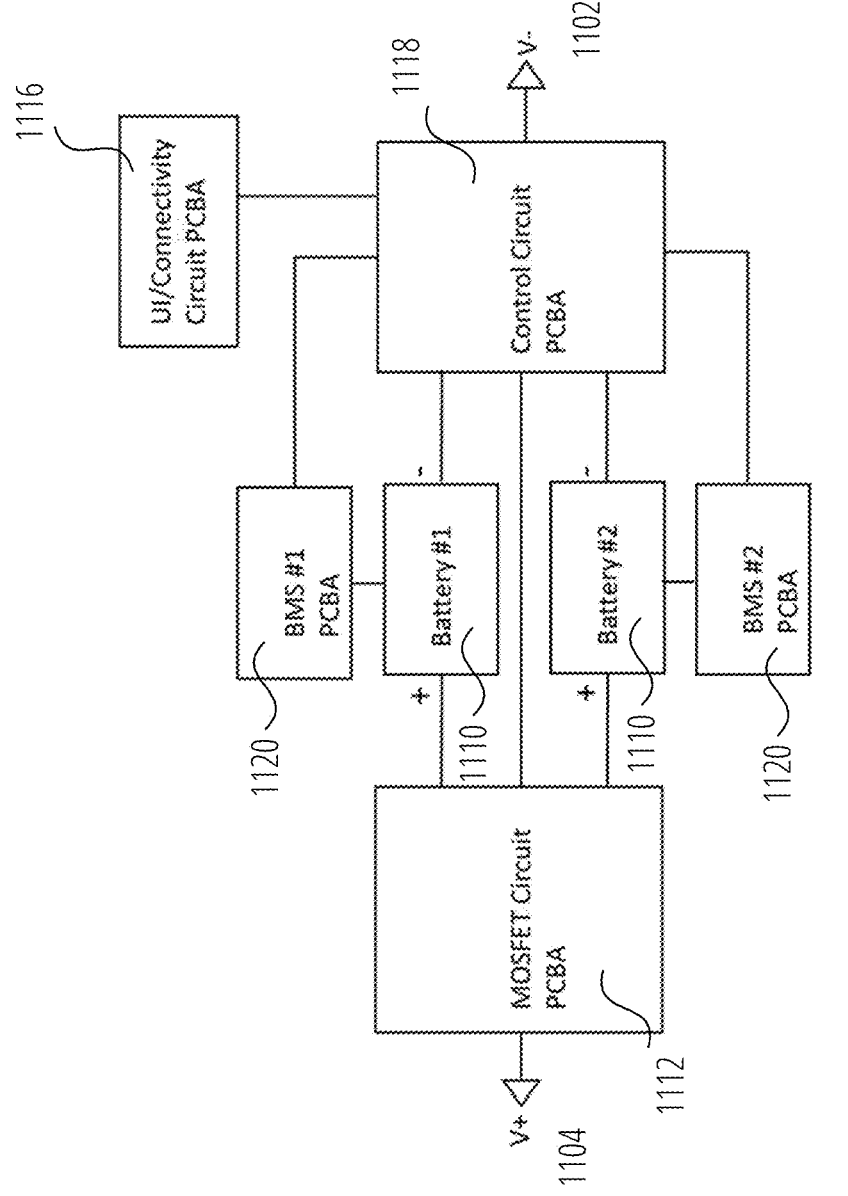
FIG. 16 is a block diagram of electrical circuitry in the internal electrical components of FIG. 11-FIG. 15.

UI/connectivity circuit PCBA 1116 controls a user interface 1402 (see e.g., FIG. 14). In some embodiments, the user interface includes one or more push buttons, an OLED display, and LEDs to indicate states and critical communication to the user. In some embodiments (see, e.g., FIG. 13), the user interface, buttons, and other functions (such as cellular communications) can be provided using a remote device that may be located in the vehicle cab or another location. Communication to the remote device may be via wireless communication or wire. Wire connections may be direct, or through a vehicle communications bus, such as a CAN network.

MOSFET switch circuit PCBA 1112, control circuit PCBA 1118, and BMS circuit 1120 are explained in greater detail with reference to, respectively, FIG. 17A, FIG. 17B, and FIG. 18. In general, the circuitry (see e.g., FIG. 16) is configured to monitor a system voltage and detect when cranking is initiated. During cranking, the system voltage is increased to deliver more power to starter 110.

In light of this disclosure, skilled persons will appreciate that battery group 1110 need not be integrated into the same housing as control electronics. Control electronics could be used with external batteries, as an example with higher than nominal 12V batteries/battery group, which could be configured with a series, parallel or series parallel combination of batteries. As an example, the control electronics could be used with one or more lead acid batteries with terminal voltage higher than nominal 12V, or with series combination of nominal 12V batteries connected in series.

FIG. 13 shows an example user interface display 1300 that may be deployed in a cab of a vehicle. This display can be configured as an LCD, OLED, or other screen technology to present real-time operating information, such as battery state-of-charge, system status, or fault messages. In this example, user interface display 1300 comprises a power button 1302, a status display 1304, a menu selection 1306, a menu selection 1308, an exit 1310, and an enter 1312.

In general, user interface display 1300 may include other interactive controls, such as buttons or a touch panel, that allow an operator to review telemetry or diagnostic data, manually initiate pre-charge cycles, or adjust system modes. In various embodiments, the displayed information could include voltage readings (e.g., nominal 12V or boosted voltage levels), cranking event indicators, and alerts regarding battery temperature or internal fault conditions. The intent of FIG. 13 is to demonstrate how system data is visually communicated to the operator and how user inputs, if present, are captured to direct specific actions or configuration changes within the multi-voltage auxiliary power system.

FIG. 14 and FIG. 15 show an example of internal components (similar to internal components 1100) packaged in a modified Group 31 battery form factor 1400. Group 31 battery form factor 1400 is modified to include user interface 1402. In the example of FIG. 14 and FIG. 15, user interface 1402 includes a power button 1404, OLED display 1406, and user inputs 1408.

Figures 17A, 17B:
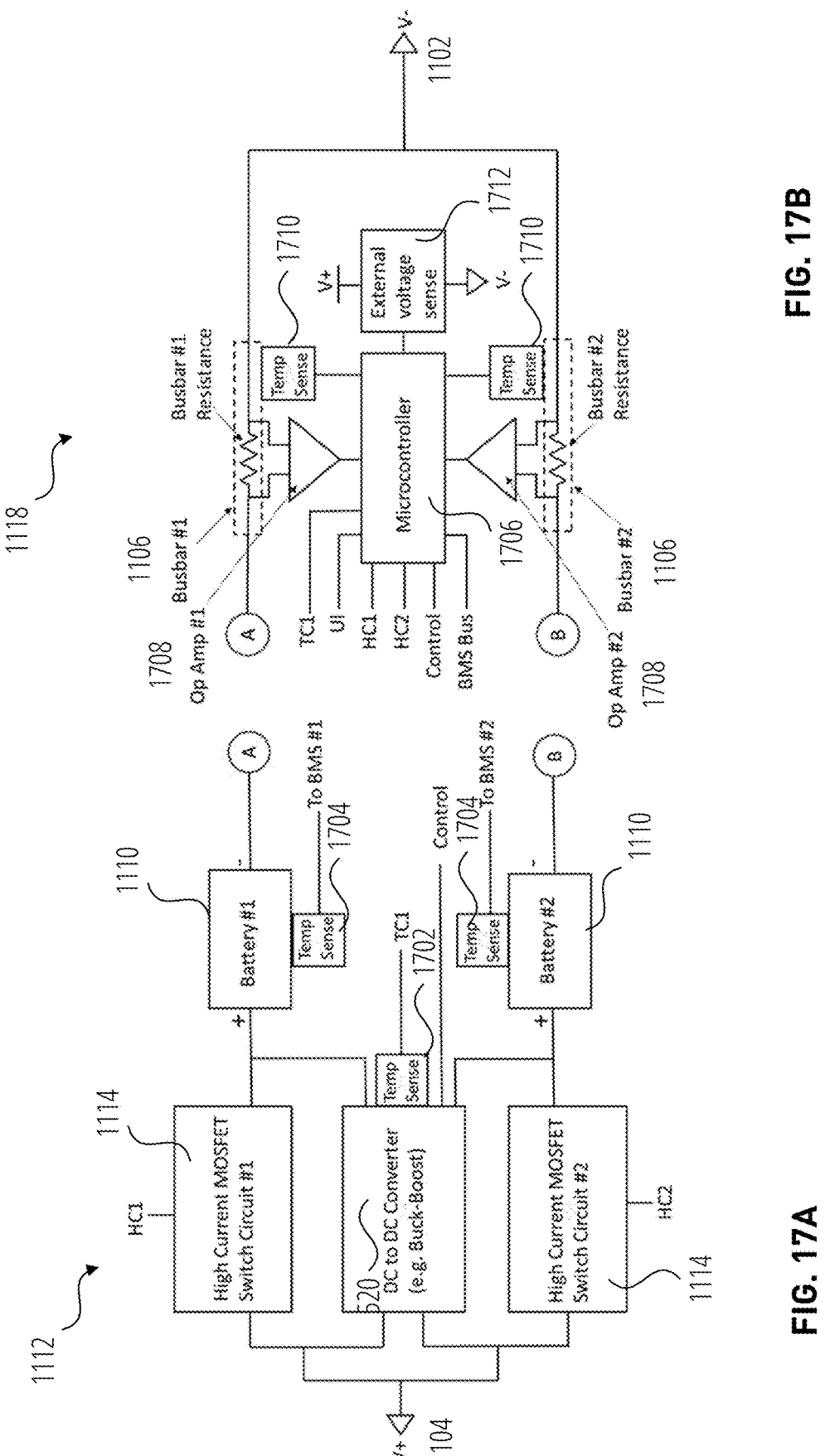
FIG. 17A is a block diagram of a MOSFET switch circuit PCBA shown in FIG. 11.
FIG. 17B is a block diagram of a control circuit PCBA shown in FIG. 11.

FIG. 17A shows an example architecture of MOSFET switch circuit PCBA 1112 and its connections to the two batteries, which is in this example is used to control voltage and current of the third example (battery with DC-to-DC converter 520) in FIG. 5. The output voltage is controlled by alternatively activating the high current MOSFET switches (typically both at the same time, but they can be operated separately), which provides a direct connection of the batteries to the V+ output, and DC-to-DC converter 520, which in this case, decreases the voltage from the batteries and provides that voltage to the V+ output. Thus, using a high voltage battery, typically on the order of 16 to 18V, although other voltages may be used, the high voltage output can be provided during cranking and the voltage can be decreased to a lower voltage, typically around 12V, when not cranking to provide power to the electronics.

MOSFET switch circuit PCBA 1112 is controlled by control circuit PCBA 1118 through the HC1, HC2, and control connections. While DC-to-DC converter 520 is not active, the HC1 and HC2 control signals may activate the high current MOSFET switches to connect the positive battery terminals to the embodiment's positive output 1104 connection to provide the cranking voltage. While the high current MOSFET switch circuits are not activated, the control line may activate the DC-to-DC converter 520 to produce the nominal voltage to provide the electronics while not cranking the engine. The temperature of DC-to-DC converter 520 is monitored with a temperature sensor 1702 and the data provided to the microcontroller. The battery temperature is sensed using temperature sensors 1704 and provided to BMS circuits 1120. The MOSFET temperature is estimated in real time using real-time current measurements through control circuit PCBA busbars 1106 attached to control circuit PCBA 1118. Temperature monitoring of these components allows for termination of operation to prevent unsafe or damaging conditions.

DC-to-DC converter 520 may be bidirectional to provide charging current to the internal batteries from an external source such as an external battery or from the vehicle's alternator.

The output provided from MOSFET switch circuit PCBA 1112 may be used to disulfate external lead acid batteries using techniques understood by skilled persons.

The output provided from MOSFET switch circuit PCBA 1112 may be used to measure the ESR of external batteries using techniques understood by skilled persons.

FIG. 17B shows an example architecture of control circuit PCBA 1118, which manages control of the system. Control circuit PCBA 1118 monitors both external voltage and current being returned to each battery to determine the operational state of the vehicle (e.g., not running, cranking, running, etc.) and controls the system to provide the appropriate output (e.g., nominal 12V, high voltage, off etc.) For trucks with traditional key starters, by monitoring the external voltage, a microcontroller 1706 is able to determine when the vehicle ignition key has been moved to the ACC or ON position, or when it is moved to the START position and therefore it is able to determine whether to output nominal voltage for just powering the electronics or a higher voltage to facilitate the crank. After the engine has started, there may be a delay before the alternator is activated, so the system will provide nominal voltage until the alternator is activated and is available to provide power to the truck. op amp differential circuits 1708 measure the voltage drops across a small section of busbar #1 and busbar #2, respectively, and microcontroller 1706 calculates the current from each of the batteries. Temperature information from sensors 1710 is used to calibrate the voltage drop measurements to compensate for temperature-dependent changes in busbar resistance. Connections are made to MOSFET switch circuit PCBA 1112 for both control and feedback. Connections are made to BMS circuits 1120 and to UI/connectivity circuit PCBA 1116.

If an external battery is used, the system may monitor external voltage 1712 including battery terminal voltage and/or charging characteristics to assess the state of charge, battery state of charge (SOC), battery health and possibly make predictions of the potential lifespan of the battery.

Figure 18:
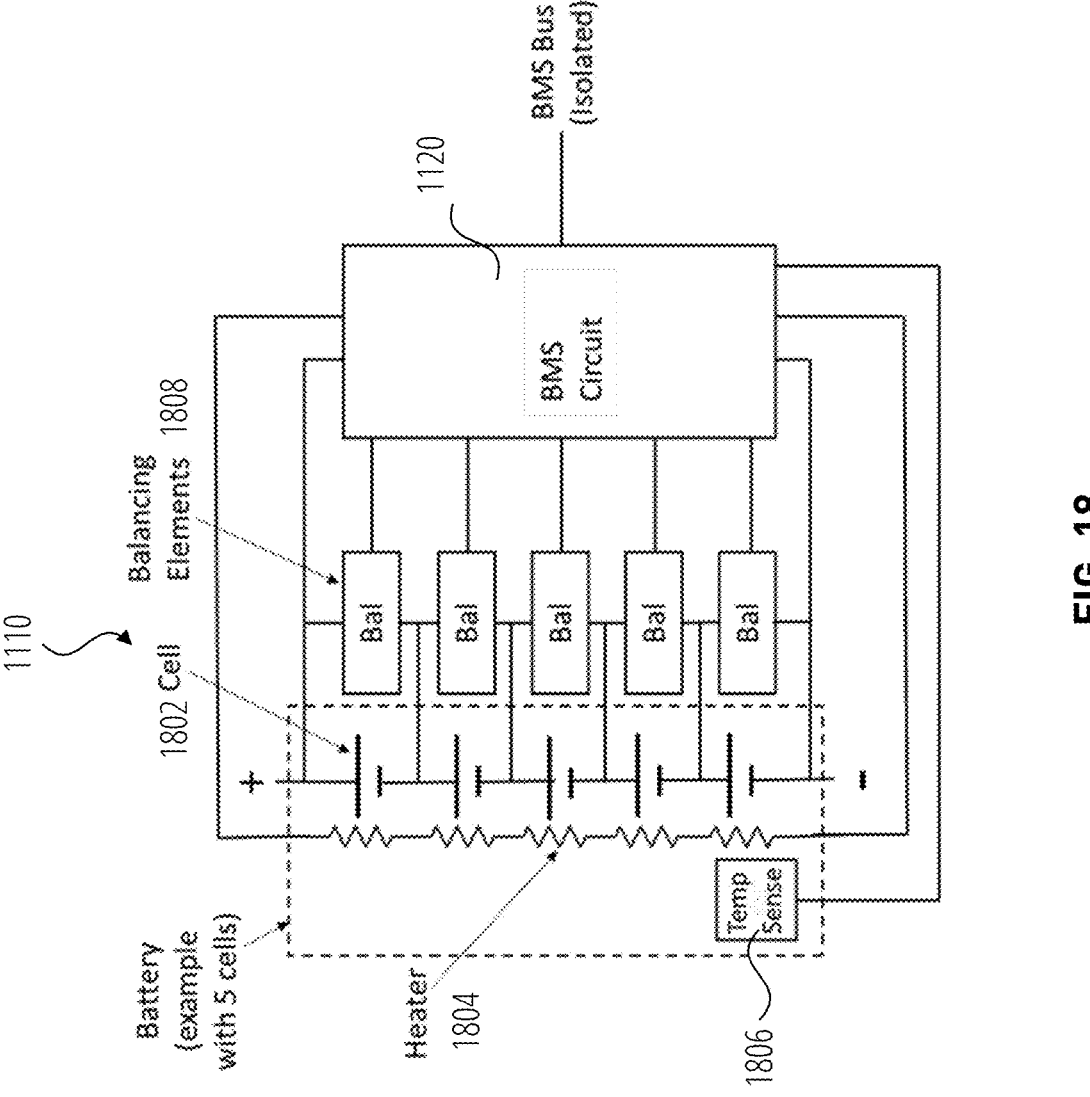
FIG. 18 is a block diagram of a BMS circuit and battery pack shown in FIG. 11.

FIG. 18 shows an example architecture of battery group 1110 and BMS circuit 1120. BMS circuit 1120 includes a five-cell battery 1802, but a different number of cells may be used, and the cells may be connected in series, parallel, or a combination of series and parallel. A heater 1804 is attached to five-cell battery 1802 to allow for self-heating of five-cell battery 1802 for cold weather operation. Alternatively, power to the heater may be provided by an external battery or batteries. In cold weather, batteries lose efficiency, however, by using its internal charge to heat five-cell battery 1802, the efficiency will recover with little impact on the battery's capacity. BMS circuit 1120 can monitor the battery temperature using a sensor 1806 to ensure operation when battery is within a predetermined temperature range.

Each cell in five-cell battery 1802 includes a balancing element 1808. As the battery charges, the individual cells may charge at different rates, so the BMS circuit 1120 balances the charges between the cells. There are many ways to do that and which could include bleeding charge from cells with higher charge and/or applying charge to cells with lower charge. This balancing function can be done with a wide variety of active and/or passive devices, which we generally refer to as balancing elements 1808. Thus, balancing elements 1808 refer to the circuitry and components within the system that actively manage the voltage levels of individual cells within a battery pack, ensuring all cells maintain a similar charge level and maximizing the battery lifespan by preventing overcharging of certain cells and undercharging of others; this is often achieved through a combination of voltage sensing, current monitoring, and specialized balancing circuits.

Figure 19:
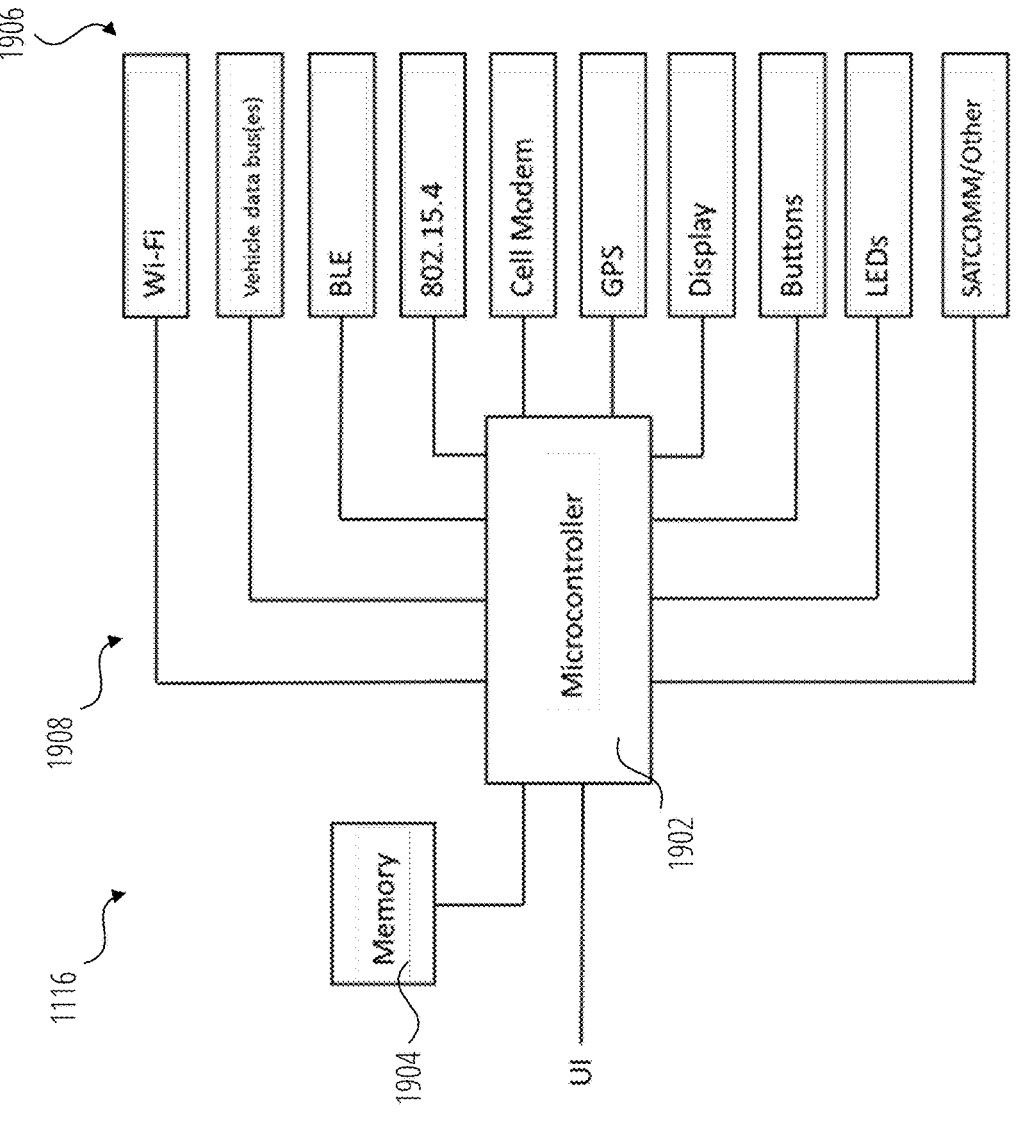
FIG. 19 is a block diagram of a UI/connectivity circuit PCBA shown in FIG. 11.

FIG. 19 shows an example architecture of UI/connectivity circuit PCBA 1116. Specifically, FIG. 19 shows a diagrammatic representation of one or more microcontrollers 1902 (or processors), one or more non-transitory computer readable medium (memory/storage devices 1904), and one or more communication resources 1906, each of which may be communicatively coupled via a bus 1908. The circuit provides the display, buttons for control and interfaces to Wi-Fi, vehicle data bus, BLE, 802.15.4, Cell, GPS, SATCOMM, LEDs and other functions. The circuit reports operation status to both the operator and other external connected systems. This subsystem can also assist the main control board by providing vehicle data bus information. Wireless subsystems provide status reporting, control, and firmware updates.

Instructions stored on memory/storage device 1904 may comprise software, a program, an application, an applet, an app, or other executable code for causing at least any of microcontroller 1902 to perform any one or more of the methods discussed herein. Instructions may reside, completely or partially, within at least one of microcontroller 1902 (e.g., within the processor's cache memory), memory/storage device 1904, or any suitable combination thereof. Furthermore, any portion of instructions may be transferred to hardware resources from any combination of peripheral devices or databases. Accordingly, the memory of microcontroller 1902, memory/storage devices 1904, peripheral devices, and databases are examples of computer-readable and machine-readable media.

Figures 11, 12:
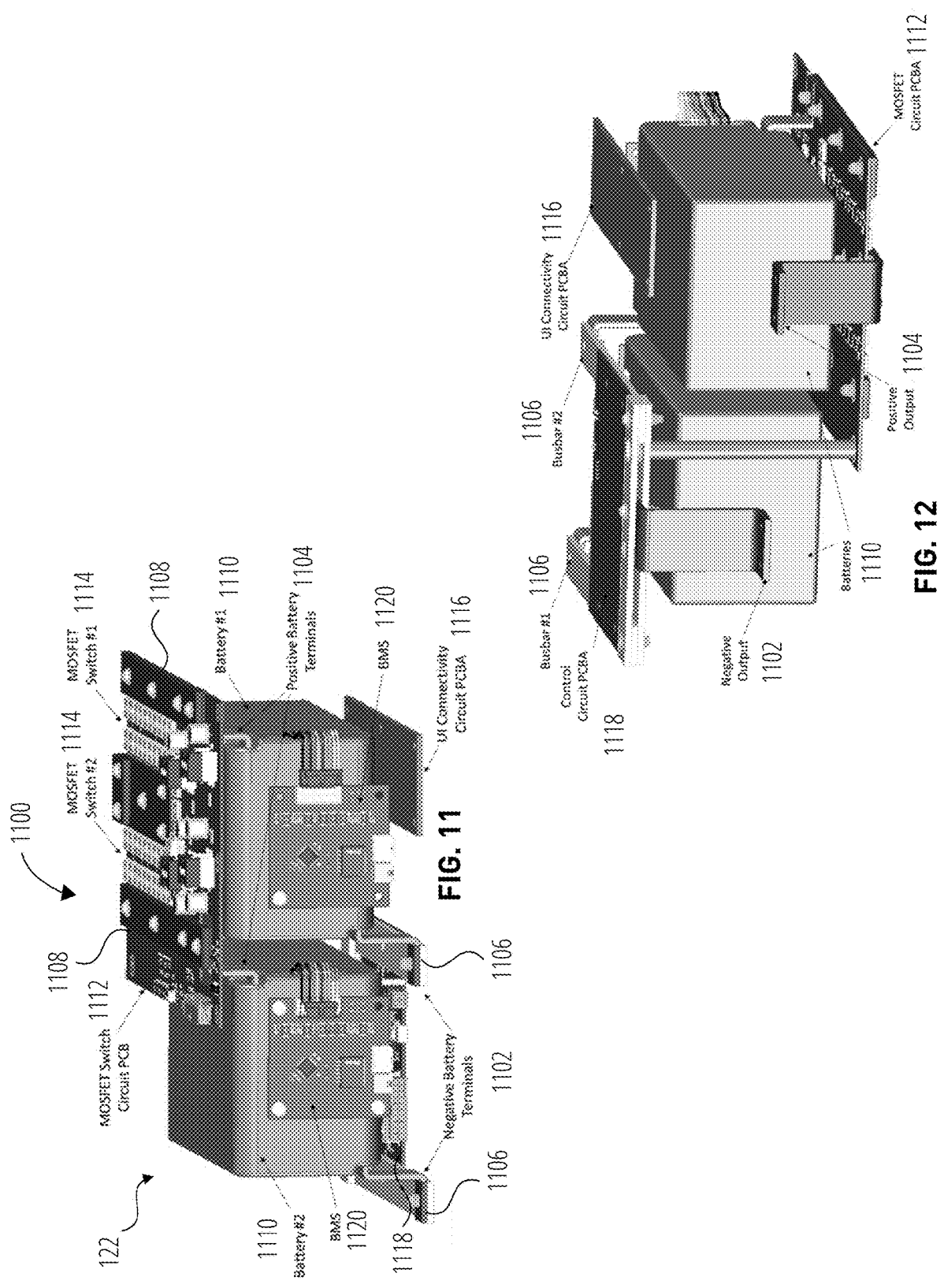
FIG. 11 is an isometric view of internal components in the multi-voltage auxiliary power system of FIG. 1.
FIG. 12 is an isometric view of internal components in the multi-voltage auxiliary power system of FIG. 1.
Figure 20:
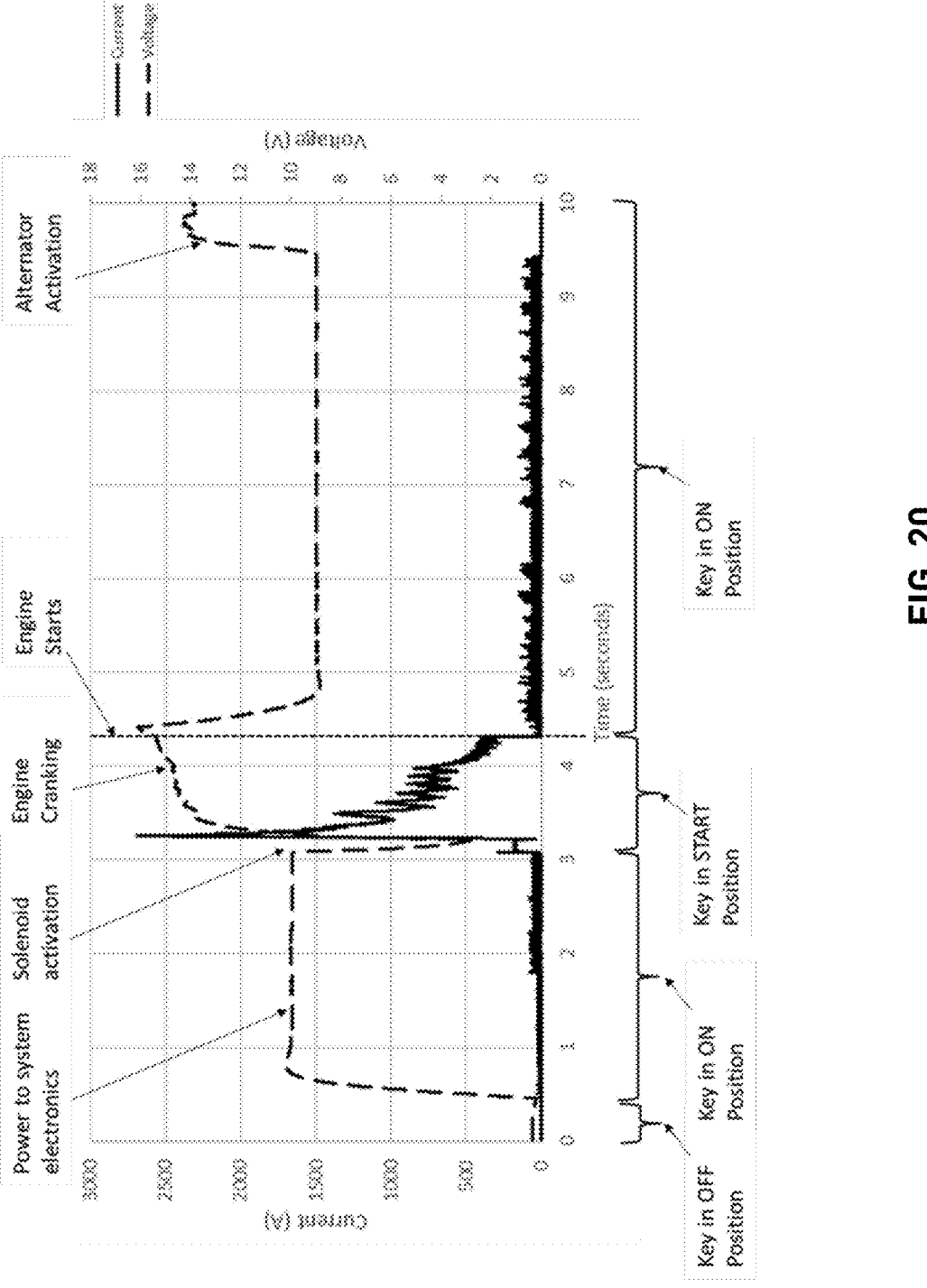
FIG. 20 is a timing diagram showing a jump start sequence using the multi-voltage auxiliary power system of FIG. 1.

FIG. 20 shows the output voltage and current of the embodiment shown in FIG. 11 and FIG. 12 when starting a semi-truck with the optional battery or battery group not connected. Initially, the key is in the off position and the embodiment is in a low power state waiting for a change in the vehicle electrical system's voltage.

Multi-voltage auxiliary power system 122 initially provides a trickle of current to the vehicle so that the next state can be observed if no vehicle batteries are present. When a voltage change is detected, which could be caused by a door opening or the key position moving from off to ON, multi-voltage auxiliary power system 122 starts to supply a nominal voltage sufficient to operate both the vehicle electronics system and the starter solenoid.

When the key is turned to the START position, the solenoid activates causing the voltage to drop. The detection of this drop in voltage causes the embodiment to output higher voltage to assist during the crank. Initially, the current increases substantially, peaking around 2,600 A, but drops quickly as the starter motor starts turning and its internal resistance increases. When the current supplied drops below a certain threshold, or if data from the vehicle bus indicates the engine has started, the system decreases the voltage to a nominal level high enough to support operation of the vehicle electronics until the alternator activates, but low enough to ensure the alternator activates. If the voltage falls outside this range, the alternator will never activate, and the onboard systems may shut down the truck.

The system continues to deliver power in this mode until the appropriate change in vehicle voltage indicates that the alternator field has engaged, and thus the alternator is delivering power. The system then stops providing power to the vehicle, no matter the state (or presence) of the vehicle's batteries. The alternator will provide enough power to keep the vehicle's engine running.

Once the engine is running and the alternator is providing power, the unit can proceed with other operations such as telemetry, internal battery management, or enter a low power mode.

Figure 21:
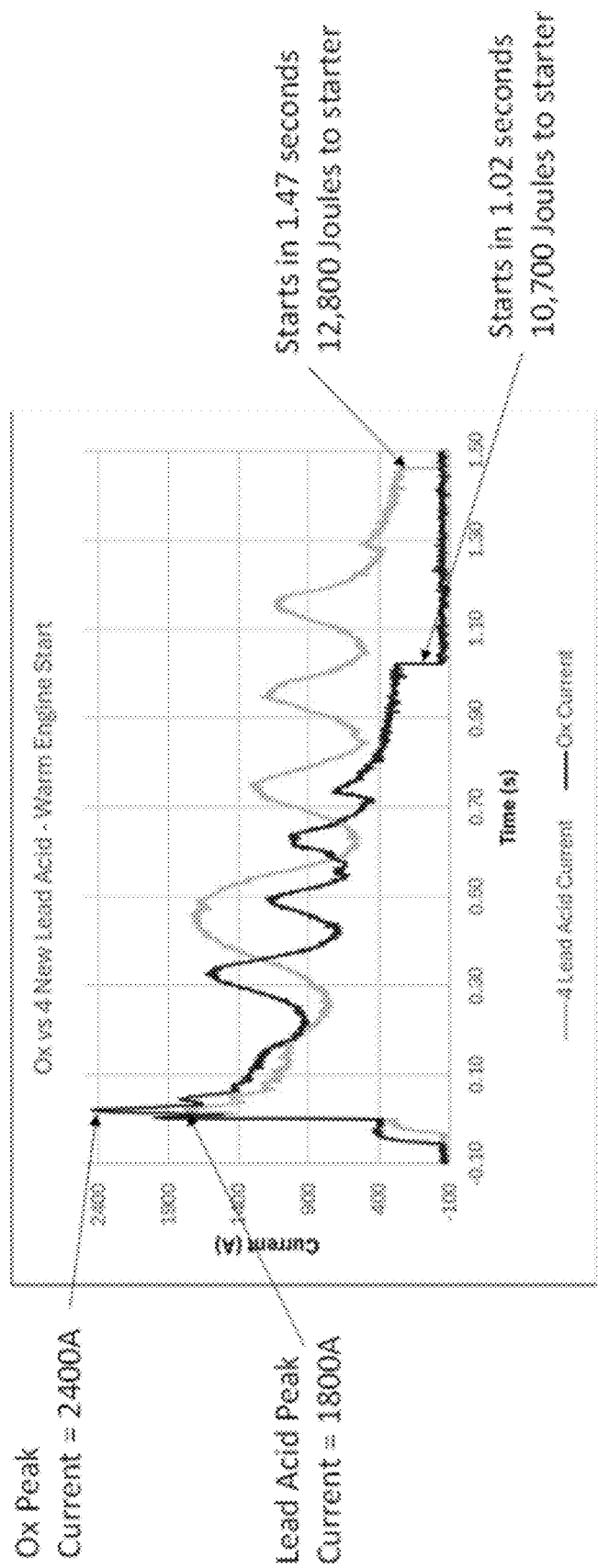
FIG. 21 is a timing diagram comparing current during a conventional start and a jump start sequence using the multi-voltage auxiliary power system of FIG. 1.
Figure 22:
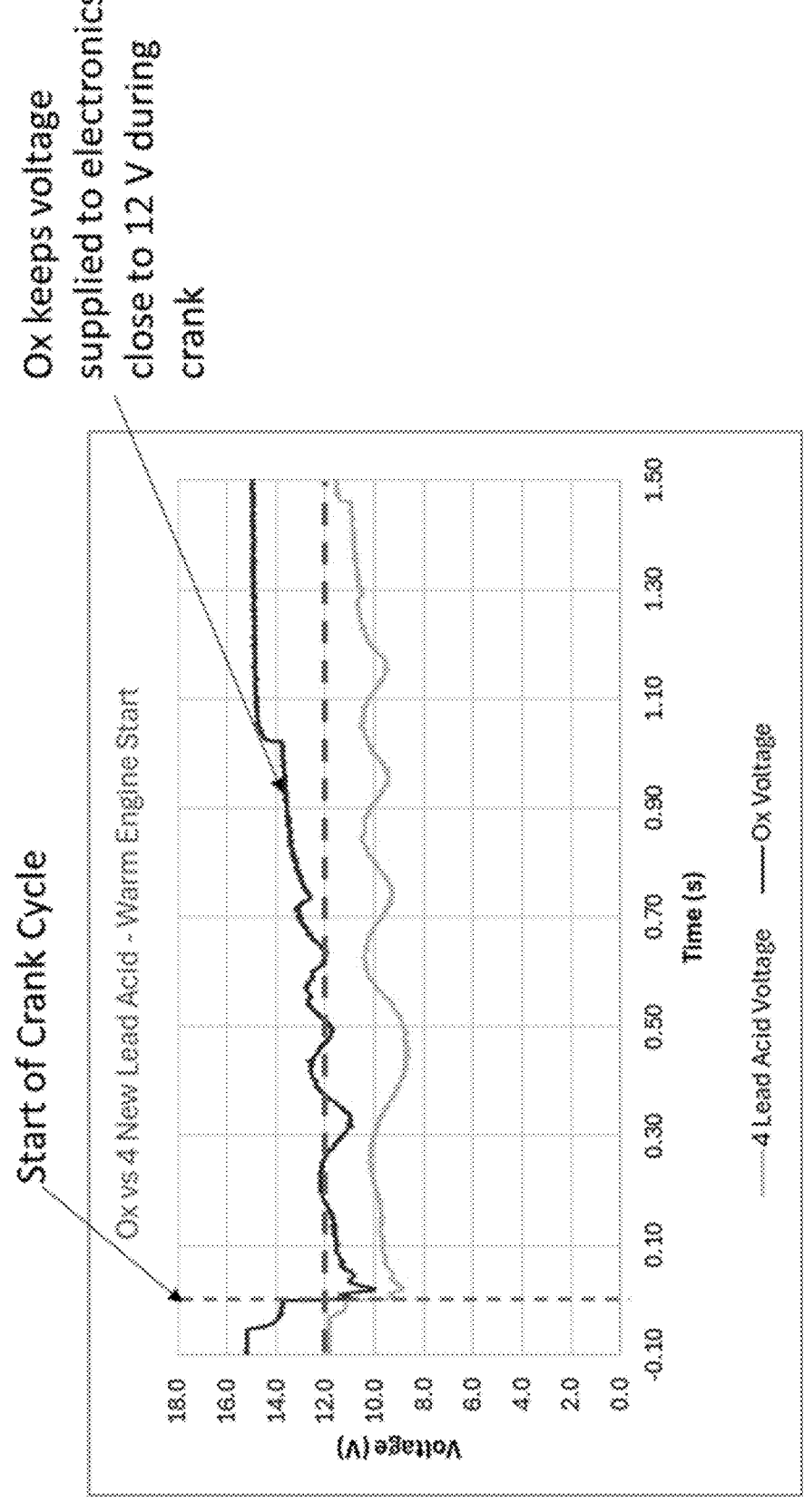
FIG. 22 is a timing diagram comparing voltage during a conventional start and a jump start sequence using the multi-voltage auxiliary power system of FIG. 1.

FIG. 21 and FIG. 22 are timing diagrams comparing current and voltage during a conventional start using four lead acid batteries and a start using multi-voltage auxiliary power system 122 of FIG. 1, instead of batteries 104 (all the lead acid batteries were removed from the semi-truck). The lead acid current data in FIG. 21 and the lead acid voltage data in FIG. 22 were measured simultaneously. Similarly, multi-voltage auxiliary power system 122 current data in FIG. 21 and multi-voltage auxiliary power system 122 voltage data in FIG. 22 were measured simultaneously. Multi-voltage auxiliary power system 122 could have been used in conjunction with some or all of batteries 104, however, the comparative performance of multi-voltage auxiliary power system 122 is more easily illustrated by testing it independently from lead acid batteries 104.

In the conventional start trace of FIG. 21, the current ramps up to a peak of about 1,800 A and decreases as the starter motor begins spinning. In this case, the truck starts in about 1.47 seconds with the lead acid batteries delivering about 12,800 joules to the starter motor during that time (the crank cycle). In contrast, multi-voltage auxiliary power system 122 produces a peak current of about 2,400 A and starts the truck in 1.02 seconds. Importantly, it accomplishes the start by delivering only 10,700 Joules to the starter during the crank cycle, meaning it requires less energy to start the truck. Because less energy is delivered to the starter, the starter's temperature will rise less than the case of using lead acid batteries 104 and will likely have a longer lifetime. Thus, FIG. 21 highlights the performance benefit of multi-voltage auxiliary power system 122 as compared to lead acid batteries 104. Furthermore, the same benefits of faster more reliable and efficient starts are demonstrated when used in conjunction with lead acid batteries.

FIG. 22 is a timing diagram illustrating how the voltage to ECM 108 and electronics unit 106 behaves over time in both a conventional start with four lead acid batteries and a start using multi-voltage auxiliary power system 122 with no lead acid batteries 104 present. The conventional start trace shows an initial nominal 12V supply that sags significantly under the heavy load of cranking, dropping below 10V at times after the start of the crank cycle. In contrast, multi-voltage auxiliary power system 122 operates at a higher baseline voltage-often between 15V and 18V—which then dips somewhat under load but stays substantially closer to the ideal voltage of 12V throughout the cranking event. In this case, multi-voltage auxiliary power system 122 was initially set to the higher baseline of about 15V before the start of the crank cycle. However, the voltage could have been set to a nominal 12V and then switched to the elevated voltage as soon as the crank cycle started and then back to nominal 12V when the vehicle started. If that had been done, the resulting voltage to the electronics would have been very close to the ideal voltage of 12V before, during, and after the crank cycle. After the engine begins running, the system transitions from the elevated voltage back to a nominal 12V level, allowing the vehicle's alternator to assume power delivery. FIG. 22, therefore, demonstrates how multi-voltage auxiliary power system 122 prevents dramatic voltage drops to the vehicle electronics 108 and 106 during cranking.

CONCLUDING REMARKS

In light of this disclosure, skilled persons will appreciate that many changes may be made to the details of the above-described embodiments without departing from the underlying principles of the invention. For example, some heavy-duty industrial and military equipment operate on 24V electrical system voltages, in which case the aforementioned techniques may be employed to change from a 24V nominal voltage during cranking to a higher 30V or 35V cranking voltage. The scope of the present invention should, therefore, be determined only by claims and equivalents.

What is claimed is:

1. A multi-voltage auxiliary power system for heavy-duty equipment having a starter and vehicle electronics powered by a nominal 12V supply, the multi-voltage auxiliary power system comprising:

a battery system configured to be electrically coupled with the starter and the vehicle electronics of the heavy-duty equipment and provide first and second output voltage levels that are different from each other, in which the first output voltage level is higher than the second output voltage level and the first output voltage level is a chemical battery terminal voltage of the battery system;

control circuitry configured to:

detect a cranking event in the heavy-duty equipment based on a first detected transition of a vehicle operating mode from a non-start state to a start attempt state;

in response to detecting the cranking event, apply the first output voltage level through its electrical connections to the starter;

detect a completion of the cracking event in the heavy duty vehicle based on a second detected transition of the vehicle operating mode from the start attempt state to a run state; and in response to detecting the completion, automatically without user intervention, transition from applying the first output voltage level to applying the second output voltage level to sustain the nominal 12V supply for the vehicle electronics when the cranking is complete.

2. The multi-voltage auxiliary power system of claim 1, in which the battery system comprises a dual voltage battery pack capable of providing both the first and second output voltage levels.

3. The multi-voltage auxiliary power system of claim 1, in which the battery system comprises two separate batteries, each configured to provide one of the first and second output voltage levels.

4. The multi-voltage auxiliary power system of claim 1, in which the battery system comprises a DC-to-DC converter configured to receive the chemical battery terminal voltage corresponding to the first output voltage level and to generate the second output voltage level.

5. The multi-voltage auxiliary power system of claim 1, in which the control circuitry is further configured to provide telemetric data representing a state of the vehicle's batteries via wireless communication to a remote monitoring system.

6. The multi-voltage auxiliary power system of claim 5, further comprising a GPS module for providing location data as part of the telemetric data in connection with cranking events.

7. The multi-voltage auxiliary power system of claim 1, further comprising a user interface to indicate crank-state transitions, including application of the first output voltage during a cranking event and switching to the second output voltage after the cranking is complete.

8. The multi-voltage auxiliary power system of claim 1, in which the control circuitry is further configured to provide a pre-charge voltage higher than the nominal 12V supply to vehicle batteries installed in the heavy-duty vehicle to prepare them for starting.

9. The multi-voltage auxiliary power system of claim 1, further comprising an internal heating element configured to maintain battery system performance at low temperatures for a cranking event, and to be disabled once the cranking event is complete.

10. The multi-voltage auxiliary power system of claim 1, in which the control circuitry is further configured to receive through a wireless connection over-the-air firmware updates to modify cranking-event detection or voltage-transition logic.

11. The multi-voltage auxiliary power system of claim 1, in which the control circuitry is further configured to disconnect the battery system from the vehicle electronics when the vehicle is not running, thereby preventing parasitic power drain.

12. The multi-voltage auxiliary power system of claim 1, in which the battery system is packaged within a housing compatible with a Group 31 battery form factor, allowing installation in a standard Group 31 battery compartment.

13. The multi-voltage auxiliary power system of claim 1, in which the control circuitry includes a voltage monitoring system configured to shut down the auxiliary power system if an overcurrent condition is detected during or after a cranking event, thereby protecting the multi-voltage auxiliary power system and vehicle electronics.

14. The multi-voltage auxiliary power system of claim 1, further comprising circuitry configured to perform a desulfation process on a lead-acid battery used to power the vehicle electronics.

15. A method, performed by a multi-voltage auxiliary power system in heavy-duty equipment having a starter and vehicle electronics powered by a nominal 12V supply, the method comprising:

detecting a cranking event in the heavy-duty equipment using control circuitry based on a first detected transition of a vehicle operating mode from a non-start state to a start-attempt state;

in response to detecting the cranking event, applying a first output voltage level through its electrical connections to the starter, to increase starting power, wherein the first output voltage level is higher than the nominal 12V supply and the first output voltage level is a chemical battery terminal voltage of a battery system in the multi-voltage auxiliary power system, and in which the battery system is configured to be electrically coupled with the starter and the vehicle electronics of the heavy-duty equipment;

detecting completion of the cranking event ba sed ted transition of the vehicle operating mode from the start-attempt sta te to a run state;

in response to detecting completion of the cranking event, automatically, without user intervention, transitioning from applying the first output voltage level to applying a second output voltage level to sustain the nominal 12V supply for the vehicle electronics when the cranking is complete; and isolating the battery system from the vehicle electronics when the heavy-duty equipment is turned off, thereby preventing parasitic power drain.

16. The method of claim 15, further comprising transmitting telemetric data on a state of the vehicle's batteries and location to a remote monitoring system via wireless communication.

17. The method of claim 15, further comprising providing a pre-charge voltage higher than the nominal 12V supply to vehicle batteries installed in the heavy-duty vehicle before cranking to enhance starting performance.

18. The method of claim 15, further comprising receiving via a wireless connection over-the-firmware updates to update the control circuitry for cranking-event detection or voltage-transition logic.

19. The method of claim 15, further comprising activating an internal heating element in the battery system to enable starting in temperatures down to −40° C. during a cranking event, and to be disabled once the cranking event is complete.

20. The method of claim 15, further comprising disconnecting the battery system from the vehicle electronics when the heavy-duty equipment is off to prevent parasitic power drain.

* * * * *